United States Patent
Rico Alvarino et al.

(10) Patent No.: US 9,948,481 B1
(45) Date of Patent: Apr. 17, 2018

(54) UPLINK VOICE AND VIDEO ENHANCEMENTS

(71) Applicant: QUALCOMM Incorporated, San Diego, CA (US)

(72) Inventors: Alberto Rico Alvarino, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/602,751

(22) Filed: May 23, 2017

Related U.S. Application Data

(60) Provisional application No. 62/405,783, filed on Oct. 7, 2016.

(51) Int. Cl.
  *H04L 5/26* (2006.01)
  *H04L 12/433* (2006.01)
  *H04B 7/06* (2006.01)
  *H04W 72/04* (2009.01)

(52) U.S. Cl.
  CPC ......... *H04L 12/433* (2013.01); *H04B 7/0654* (2013.01); *H04B 7/0656* (2013.01); *H04W 72/042* (2013.01); *H04W 72/0413* (2013.01)

(58) Field of Classification Search
  CPC ........... H04W 72/042; H04W 72/0413; H04W 76/023; H04L 12/433; H04B 1/00654; H04B 7/0656
  See application file for complete search history.

(56) References Cited

U.S. PATENT DOCUMENTS

| | | | |
|---|---|---|---|
| 8,594,029 | B2 | 11/2013 | Torsner et al. |
| 8,976,764 | B2 | 3/2015 | Suzuki et al. |
| 9,408,104 | B1 | 8/2016 | Vivanco et al. |
| 2012/0270606 | A1* | 10/2012 | Kim .......... H04M 1/22 455/566 |
| 2014/0029552 | A1 | 1/2014 | Lv et al. |
| 2014/0293883 | A1* | 10/2014 | Wang .......... H04W 72/04 370/329 |
| 2015/0078337 | A1* | 3/2015 | Kim .......... H04L 65/1083 370/331 |

(Continued)

OTHER PUBLICATIONS

Huawei, et al., "Discussion on VoLTE Coverage Enhancements", 3GPP Draft; R1-1608606, 3rd Generation Partnership Project (3GPP), vol. RAN WG1, No. Lisbon, Portugal; 20161010-20161014, Oct. 1, 2016 (Oct. 1, 2016), XP051158962, 4 Pages, Retrieved from the Internet: URL: http://www.3gpp.org/ftpjtsg_ranjWG1_RL1/TSGR1_86b/Docs/ [retrieved on Oct. 1, 2016].

Huawei, et al., "HARQ Process Selection for UL Asynchronous HARQ", 3GPP Draft; R2-163958 HARQ Process Selection for UL Asynchronous HARQ, 3rd Generation Partnership Project (3GPP), vol. RAN WG2, No. Nanjing, China; 20160523-20160527, May 22, 2016 (May 22, 2016), XP051105309, pp. 1-3, Retrieved from the Internet: URL: http://www.3gpp.org/ftp/Meetings_3GPP_SYNC/RAN2/Docs/ [retrieved on May 22, 2016].

International Search Report and Written Opinion—PCT/US2017/055385—ISA/EPO—dated Jan. 18, 2018.

(Continued)

*Primary Examiner* — Minh-Trang Nguyen
(74) *Attorney, Agent, or Firm* — Nerrie M. Zohn

(57) ABSTRACT

The present disclosure may provide technique(s) to configure a UE for asynchronous UL HARQ transmission. In an aspect of the disclosure, a method, a computer-readable medium, and an apparatus are provided. The apparatus may perform an initial RRC configuration procedure. The apparatus may transmit a first RRC message. The first RRC message may indicate that the UE supports a VoLTE mode. The apparatus may receive a second RRC message from the base station. The second RRC message may configure the UE to operate in VoLTE mode. The apparatus may monitor a CSS for a first uplink grant in first DCI. The first uplink grant may not contain an uplink HARQ ID field. The apparatus may monitor a USS for a second uplink grant in second DCI. The second uplink grant may be associated with asynchronous uplink HARQ, and the second uplink grant may include a HARQ ID field.

20 Claims, 17 Drawing Sheets

(56) References Cited

U.S. PATENT DOCUMENTS

| | | |
|---|---|---|
| 2015/0124671 A1 | 5/2015 | Tabet et al. |
| 2015/0215082 A1 | 7/2015 | Agiwal et al. |
| 2016/0073284 A1* | 3/2016 | Qian ................ H04W 52/0229 370/241 |
| 2016/0095020 A1* | 3/2016 | Balakrishnan .... H04W 36/0022 370/331 |
| 2016/0323883 A1 | 11/2016 | Wu |
| 2016/0353415 A1* | 12/2016 | Sarkar ................ H04W 72/042 |
| 2017/0171842 A1* | 6/2017 | You .................... H04W 72/042 |
| 2017/0222749 A1* | 8/2017 | Dinan .................. H04J 14/021 |
| 2017/0230994 A1* | 8/2017 | You .................. H04W 72/1263 |

OTHER PUBLICATIONS

Nokia, et al., "Interaction Between Synchronous and a Synchronous UL HARQ for 1ms TTI", 3GPP Draft; R1-1609319, 3rd Generation Partnership Project (3GPP), vol. RAN WG1, No. Lisbon, Portugal; 20161010-20161014, Sep. 30, 2016 (Sep. 30, 2016), XP051158477, 5 Pages, Retrieved from the Internet: URL: http://www.3gpp.org/ftp/tsg_ran/WG1_RL1/TSGR1_86b/Docs/ [retrieved on Sep. 30, 2016].

Wi Rapporteur (Ericsson): "RAN1 Agreements for Rel-13 eMTC Sorted and Edited by Topic", 3GPP Draft; R1-157733 RAN1 Agreements for Rel-13 eMTC Sorted and Edited by Topic, 3rd Generation Partnership Project (3GPP); vol. RAN WG1, No. Anaheim, USA; 20151115-20151122, Nov. 24, 2015 (Nov. 24, 2015), XP051022931, 39 Pages, Retrieved from the Internet: URL: http://www.3gpp.org/ftp/tsg ran/WG1_RL1/TSGR1_83/Docs/ [retrieved on Nov. 24, 2015].

* cited by examiner

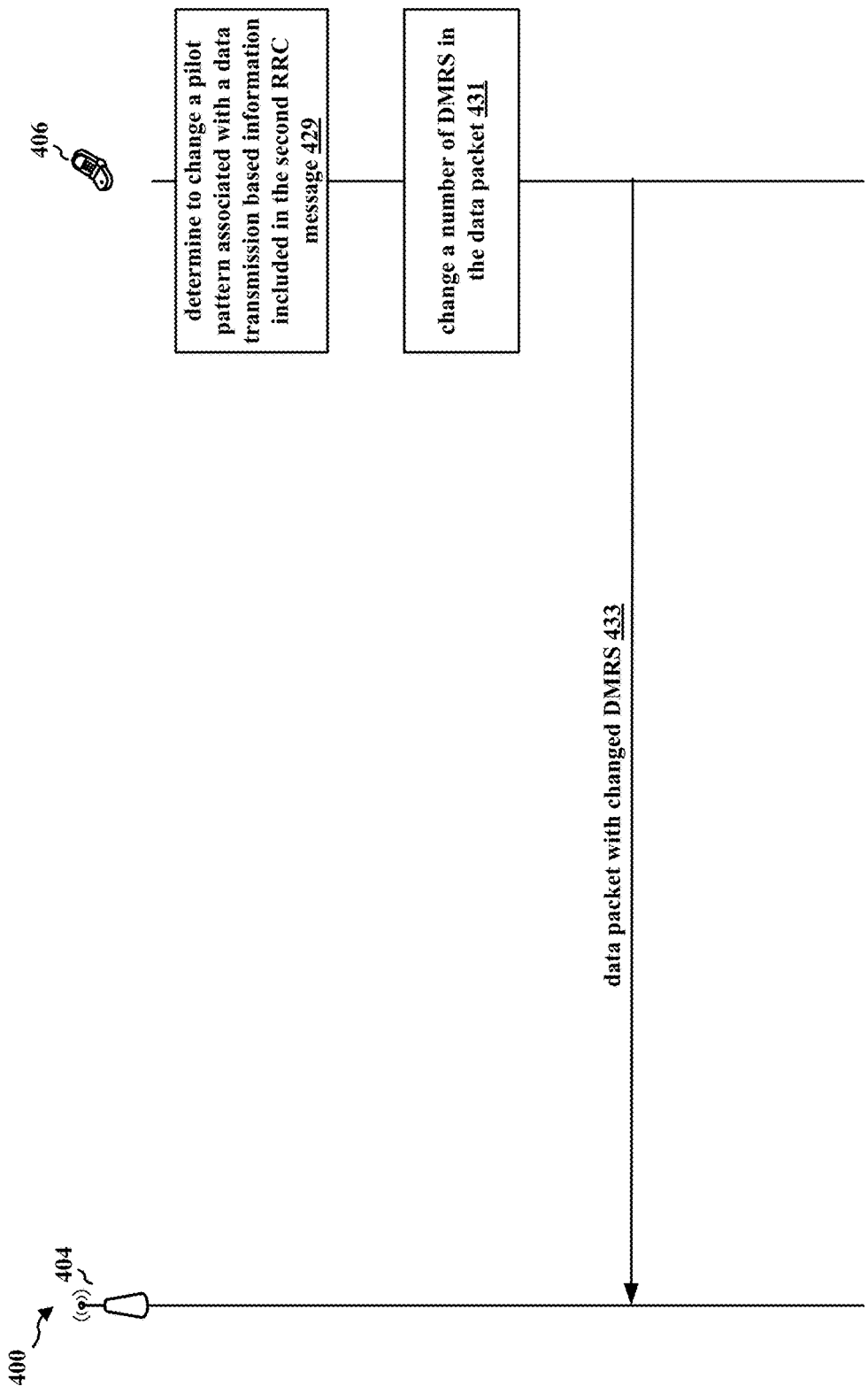

missed data packet so that the data packet may be received by the base station within the given delay.

UPLINK VOICE AND VIDEO ENHANCEMENTS

CROSS-REFERENCE TO RELATED APPLICATION(S)

This application claims the benefit of U.S. Provisional Application Ser. No. 62/405,783, entitled "PHYSICAL UPLINK SHARED CHANNEL VOICE OVER LONG TERM EVOLUTION AND VIDEO ENHANCEMENTS" and filed on Oct. 7, 2016, which is expressly incorporated by reference herein in its entirety.

BACKGROUND

Field

The present disclosure relates generally to communication systems, and more particularly, to a user equipment (UE) configured for voice over long term evolution (VoLTE) and asynchronous uplink (UL) hybrid automatic repeat request (HARQ) transmissions.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

A first property of VoLTE and/or uplink video transmissions is that data packets of a predetermined size may be transmitted at regular intervals (e.g., 20 ms) by a base station. A second property of VoLTE and/or uplink video transmissions is that the data packets may be delivered from a UE to a base station within a given delay (e.g., 80 ms) without disrupting the VoLTE and/or uplink video transmission service. However, if a data packet is not received at the base station, and a retransmission of the data packet does not arrive within the given delay, the VoLTE and/or uplink video transmission service may be disrupted. Thus, there is a need for a process to trigger, at the UE, a retransmission of a missed data packet so that the data packet may be received by the base station within the given delay.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A first property of VoLTE and/or uplink video transmissions is that data packets of a predetermined size may be transmitted at regular intervals (e.g., 20 ms) by a base station. A second property of VoLTE and/or uplink video transmissions is that the data packets may be delivered from a UE to a base station within a given delay (e.g., 80 ms) without disrupting the VoLTE and/or uplink video transmission service. However, if a data packet is not received at the base station, and a retransmission of the data packet does not arrive within the given delay, the VoLTE and/or uplink video transmission service may be disrupted. Thus, there is a need for a process to trigger, at the UE, a retransmission of a missed data packet so that the data packet may be received by the base station within the given delay.

The present disclosure provides a solution to the problem by enabling a UE to be configured for asynchronous UL HARQ transmissions. In addition, the present disclosure may enable semi-persistent scheduling (SPS) of the VoLTE and/or uplink video transmissions by the base station to reduce the downlink control overhead of the wireless communications system. Still further, the present disclosure may enable preemptive retransmission scheduling by the base station to avoid a disruption of the VoLTE and/or video transmission service when a data packet is not received at the base station.

In an aspect of the disclosure, a method, a computer-readable medium, and an apparatus are provided. The apparatus may perform an initial RRC configuration procedure with a base station. The apparatus may also transmit a first RRC message to the base station. In an aspect, the first RRC message may indicate that the UE supports a VoLTE mode. The apparatus may additionally receive a second RRC message from the base station. In an aspect, the second RRC message may configure the UE to operate in VoLTE mode. Further, the apparatus may monitor a common search space (CSS) for a first uplink grant in first DCI. In an aspect, the first uplink grant may not contain an uplink HARQ ID field. Additionally, the apparatus may monitor a UE-specific search space (USS) for a second uplink grant in second DCI. In an aspect, the second uplink grant may be associated with asynchronous uplink HARQ, and the second uplink grant may include a HARQ ID field.

In another aspect, the apparatus may perform an initial RRC configuration procedure with a UE. The apparatus may also receive a first RRC message from the UE. In an aspect, the first RRC message may indicate that the UE supports a VoLTE mode. The apparatus may further transmit a second RRC message to the UE. In an aspect, the second RRC message may configure the UE to operate in VoLTE mode. In addition, the apparatus may transmit, in a CSS, a first uplink grant in first DCI. In an aspect, the first uplink grant may not contain an uplink HARQ ID field. Further, the apparatus may transmit, in a USS, a second uplink grant in second DCI. In an aspect, the second uplink grant may include an uplink HARQ ID associated with asynchronous uplink HARQ.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 4A-4C illustrate a data flow that my enable asynchronous UL HARQ transmissions by a UE in accordance with certain aspects of the disclosure.

DETAILED DESCRIPTION

Figure 1:
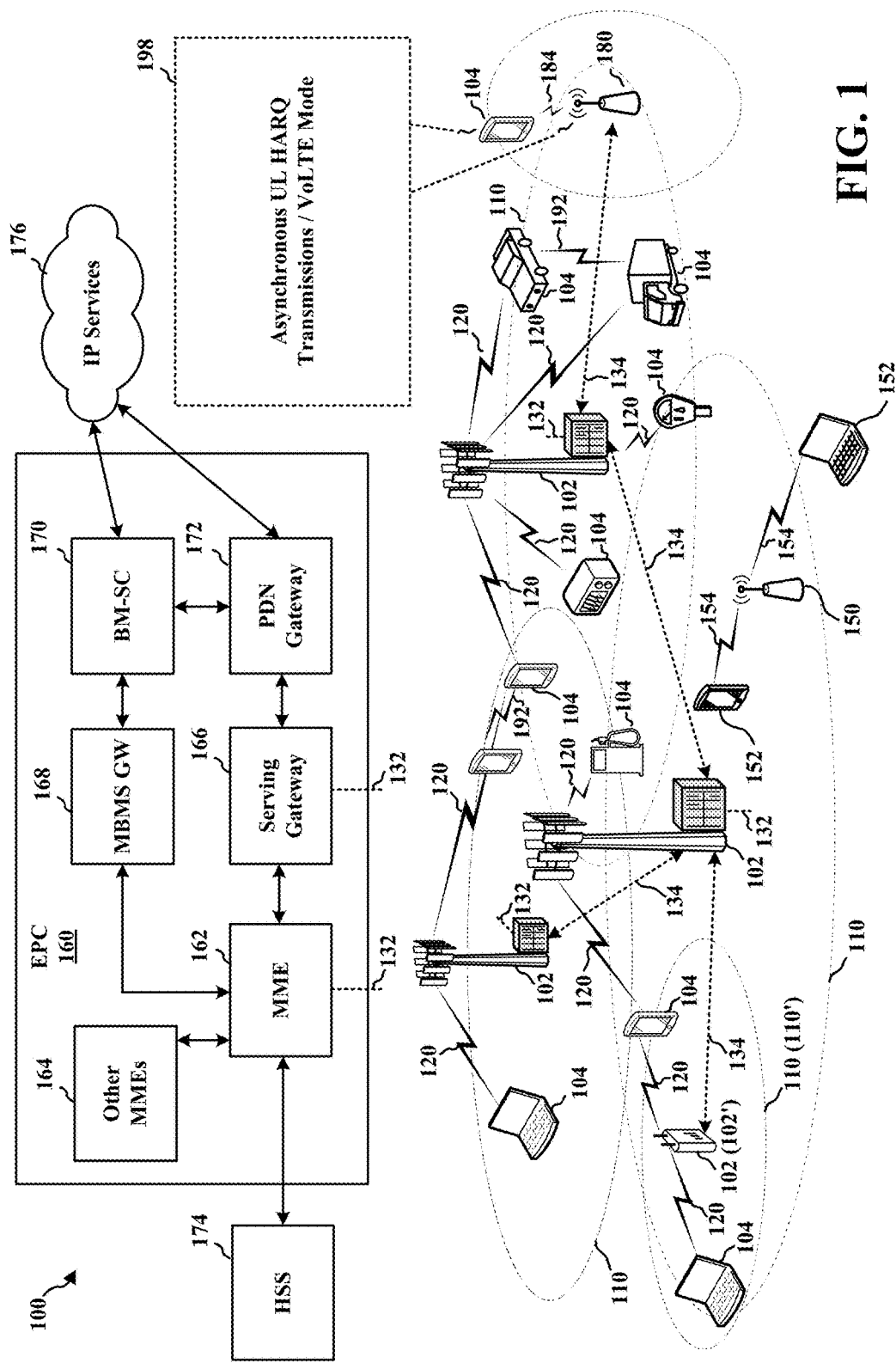
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 104. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, eNB, an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured for asynchronous UL HARQ transmissions and/or VoLTE mode (198).

Figure 2:
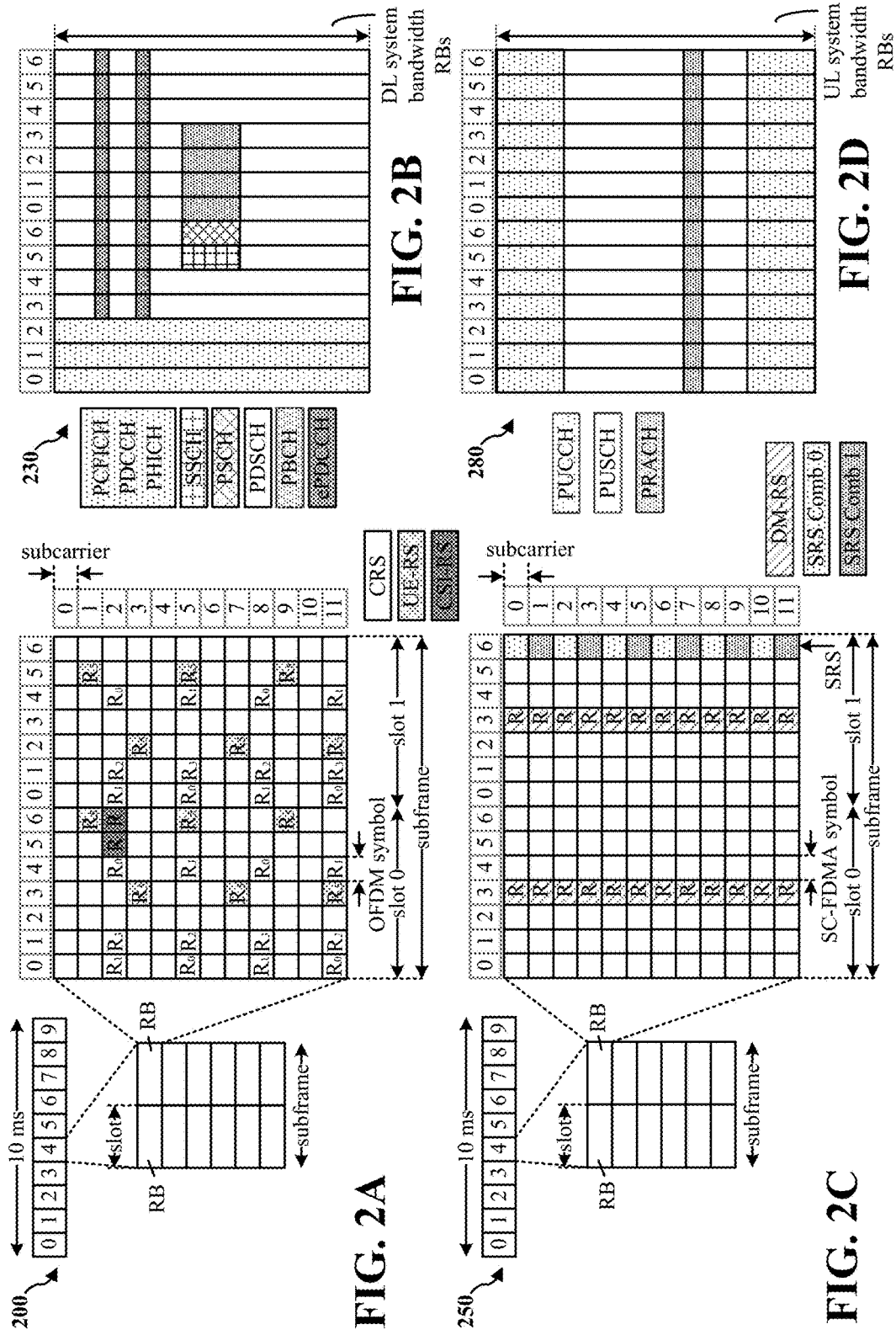
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical HARQ indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
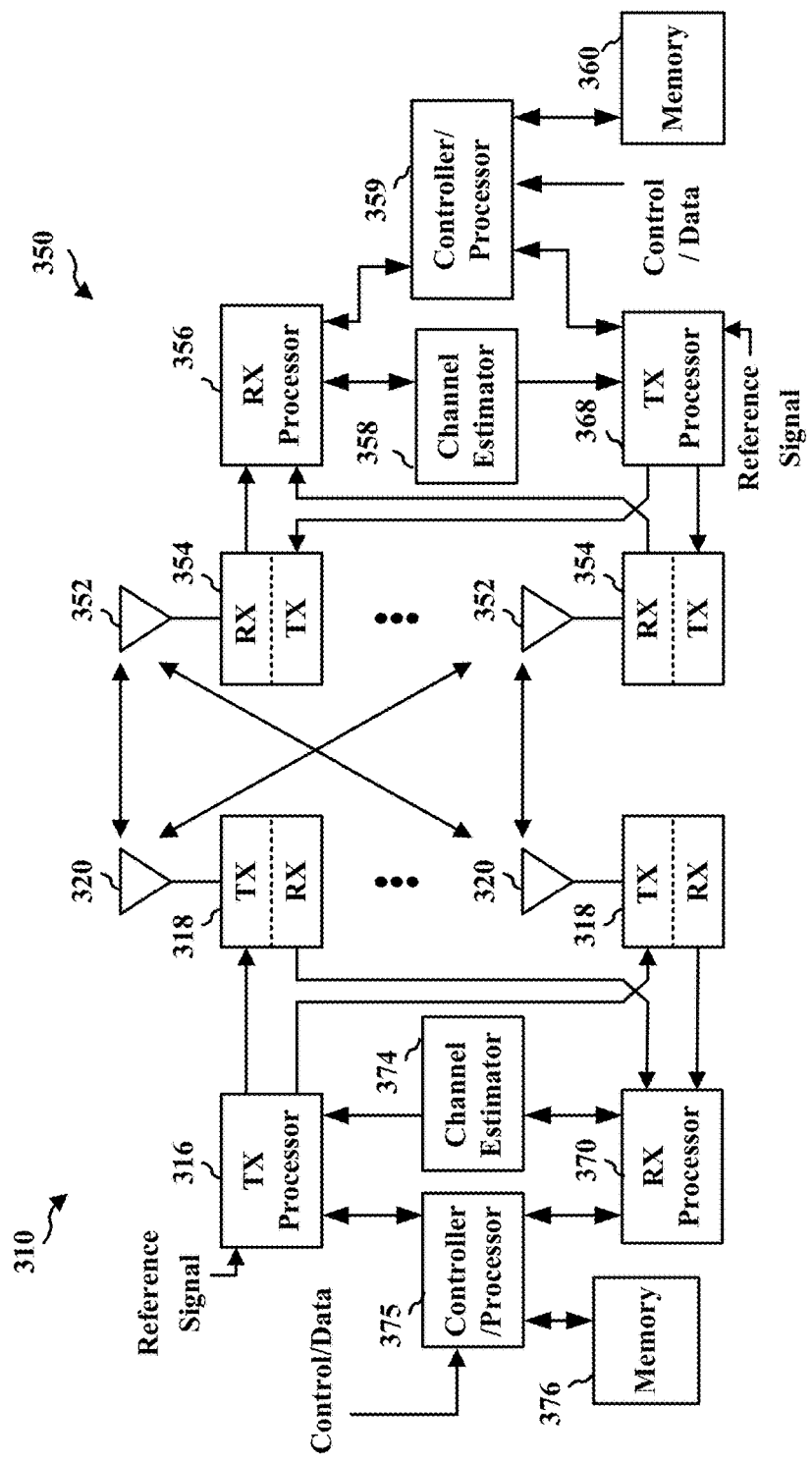
FIG. 3 is a diagram illustrating an example of an evolved NodeB (eNB) and UE in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes an RRC layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

A first property of VoLTE and/or uplink video transmissions is that data packets may be transmitted at regular intervals (e.g., 20 ms) with a size that is known by a base station. A second property of VoLTE and/or uplink video transmissions is that the data packets may be delivered from a UE to a base station within a given delay (e.g., 80 ms) without disrupting the VoLTE and/or uplink video transmission service. However, if a data packet is not received at the base station, and a retransmission of the data packet does not arrive within the given delay, the VoLTE and/or uplink video transmission service may be disrupted. There is a need to trigger, at the UE, a retransmission of a missed data packet so that the data packet may be received by the base station within the given delay.

The present disclosure provides a solution to the problem by enabling a UE to be configured for asynchronous UL HARQ transmissions. In addition, the present disclosure enables SPS of the VoLTE and/or uplink video transmissions by the base station to reduce the downlink control overhead of the wireless communications system. Still further, the present disclosure enables preemptive retransmission scheduling by the base station to avoid a disruption of the VoLTE and/or video transmission service when a data packet is not received at the base station.

Figure 4A:
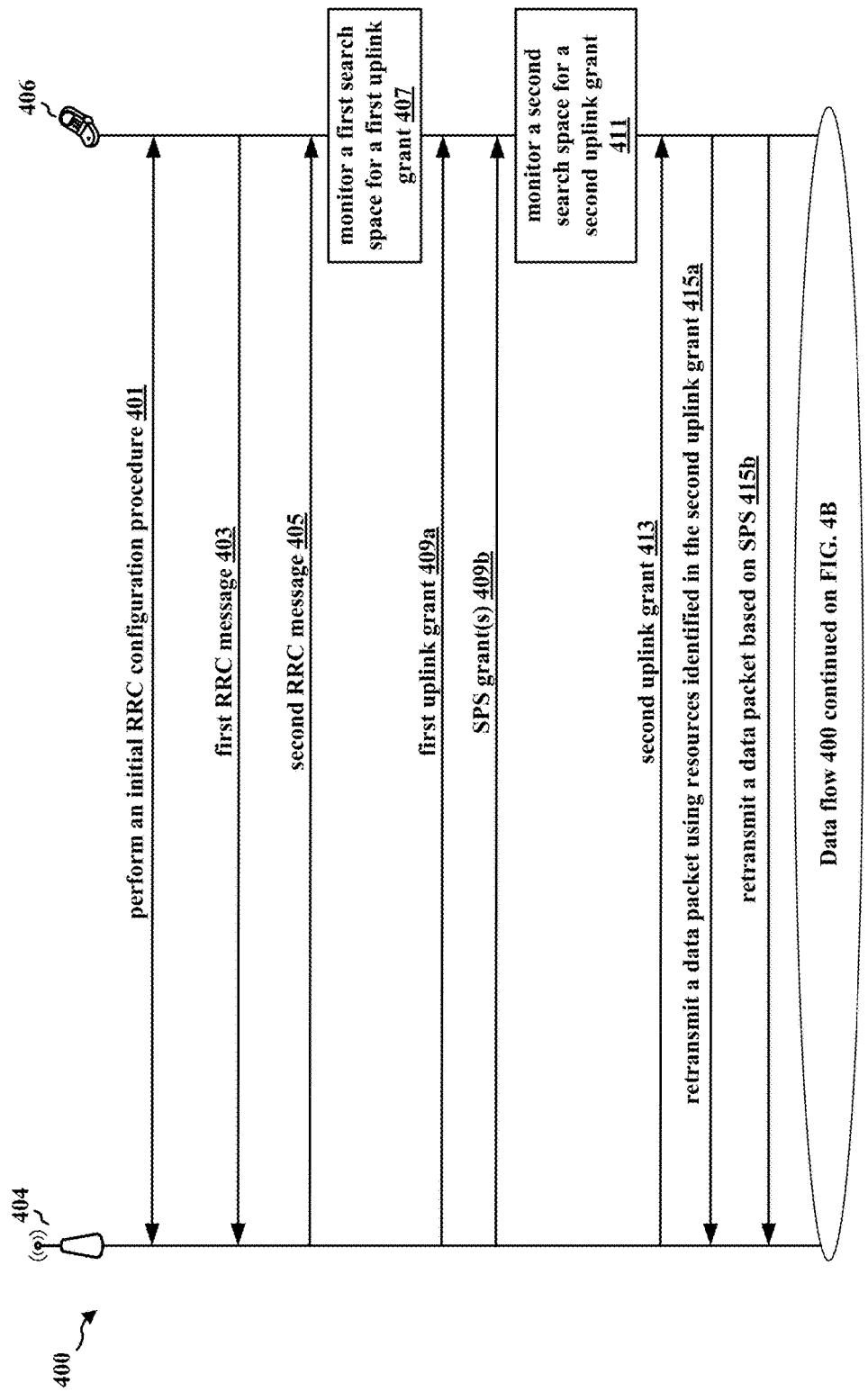
Figure 4B:
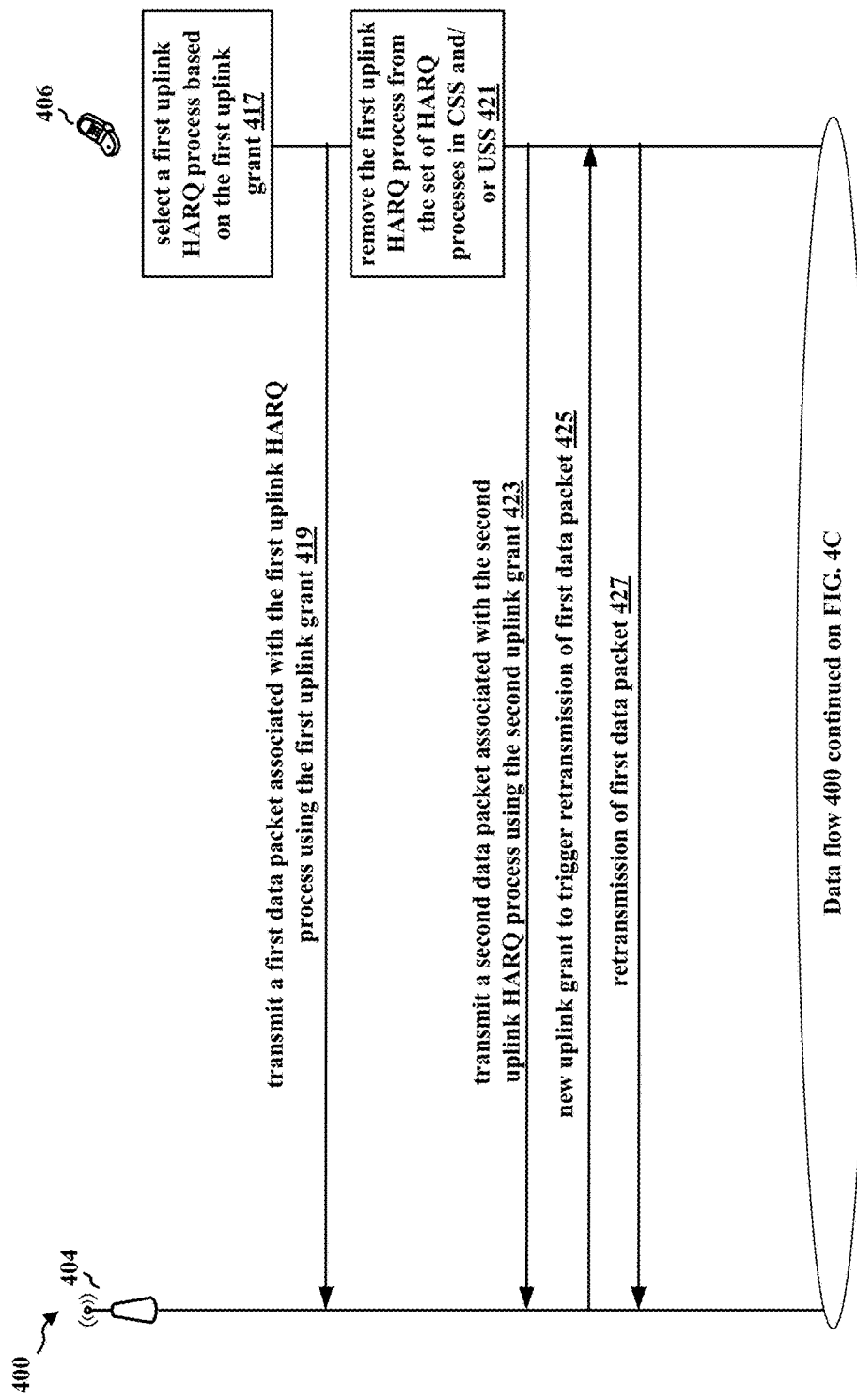

FIGS. 4A-4C illustrate a flow diagram 400 that may be used by a UE 406 to send asynchronous UL HARQ transmissions to a base station 404 in accordance with certain aspects of the disclosure. The base station 404 may correspond to, e.g., base station 102, 180, 750, eNB 310, apparatus 1002/1002'. The UE 406 may correspond to, e.g., UE 104, 350, 1050, apparatus 702/702'. In one aspect, the UE 406 may be configured for VoLTE communications and/or uplink video transmissions.

Referring to FIG. 4A, prior to communicating using VoLTE, the base station 404 and the UE 406 may perform an initial RRC configuration procedure 401. Once the initial RRC configuration procedure 401 is complete, the UE 406 may transmit a first RRC message 403 to the base station 404. In one aspect, the first RRC message 403 may indicate to the base station 404 that the UE 406 supports a VoLTE mode and/or video enhancements (e.g., the UE 406 may be able to support asynchronous UL HARQ transmissions and/or bundled transmissions). The base station 404 may configure the UE 406 in VoLTE mode by transmitting a second RRC message 405 to the UE 406. In an aspect, when a "mode change indication" is included in a second RRC message 405 that is received by the UE 406, the UE 406 may be configured in VoLTE mode. Additionally and/or alternatively, the VoLTE mode may include one or more of a number of HARQ processes for asynchronous UL HARQ operation, a maximum number of repetitions (e.g., the number of repetitions that may be signaled in an UL grant) of a data transmission that may be sent by the UE 406, and/or the actual number of repetitions of a data transmission that may be sent by the UE 406.

In the PDCCH region in a DL radio frame, there may be multiple places where a specific PDCCH may be located. The UE 406 may search all possible locations in the PDCCH region in a DL radio frame for the PDCCH. The possible location for a PDCCH may differ depending on whether the PDCCH is located in a CSS or a USS. In one aspect, the CSS may carry one of more DCIs (e.g., DCI0, DCI1A, etc.) that are common for all UEs in communication with the base station 404. In another aspect, the USS may carry one or more DCIs (e.g., a modified DCI0 or a new grant DCI0A) associated with UE-specific resource allocation(s) using the cell radio network temporary identifier (C-RNTI), SPS C-RNTI, etc., associated with the UE 406. Once configured in VoLTE mode, the UE 406 may monitor 407 a first search space for a first uplink grant 409a. For example, the first search space may be a CSS. In the CSS, the UE 406 may monitor 407 DCI0 (e.g., the DCI format that may be used to carry UL grants) and DCI1A (e.g., one DCI format that may be used to carry DL scheduling). In an aspect, DCI0 in the CSS may be used to carry the first uplink grant 409a. The first uplink grant 409a may not contain a UL HARQ identification (ID), and may be associated with synchronous UL HARQ. In synchronous UL HARQ, the retransmission(s) for each HARQ process (e.g., HARQ0, HARQ1, HARQ2, HARQ3, HARQ4, HARQ5, HARQ6, HARQ7) may be sent by the UE 406 at predetermines times relative to the initial transmission. Hence, the base station 404 may not need to signal the UL HARQ ID in the first uplink grant 409a because the UE 406 may infer the HARQ process to be retransmitted based on the transmission timing. Using the subframe number and the frame number, the UE 406 may infer the UL HARQ IDs for synchronous UL HARQ.

In addition, the UE 406 may monitor 411 a second search space for a second uplink grant 413. For example, the second search space may be a USS. In an aspect, the UE 406 may monitor 411 the USS for a different DCI grant (e.g., a modified DCI0 or a new grant DCI0A) that includes a UL HARQ ID, and may be associated with asynchronous UL HARQ. In asynchronous UL HARQ, retransmission(s) for each HARQ process (e.g., HARQ0, HARQ1, HARQ2, HARQ3, HARQ4, HARQ5, HARQ6, HARQ7) may be triggered by the UL HARQ ID that is included in the second uplink grant 413. Asynchronous UL HARQ may increase the flexibility of the communication system because retransmission(s) may not need to be scheduled as in synchronous UL HARQ.

In addition, the second uplink grant 413 may also include the number of repetitions of a retransmission, if maximum number of repetitions is signaled by the second RRC message 405. Still further, the first uplink grant 409a and the second uplink grant 413 may be the same size (e.g., allocate the same number of resources to UE 406).

Further, the base station 404 may transmit the first uplink grant 409a in first DCI. In an aspect, the first uplink grant 409a may be associated with synchronous uplink HARQ. In one configuration, the first uplink grant 409a may not contain a UL HARQ ID field. The base station 404 may transmit the second uplink grant 413 in second DCI. For example, the second uplink grant 413 may include a HARQ ID associated with asynchronous UL HARQ.

In a first example embodiment, there may be an explicit relationship between the synchronous HARQ ID (e.g., inferred by the UE 406 based on the subframe number in which the first uplink grant 409a may be received) and the asynchronous HARQ ID (e.g., which is signaled in the second uplink grant 413). For example, the UE 406 may retransmit a data packet 415a using resources allocated in the first uplink grant 409a based on the uplink HARQ ID received in the second uplink grant 413. In one aspect, the uplink HARQ ID for the first uplink grant 409a may be based on a subframe number in which the first uplink grant 409a is received (e.g., for frequency division duplex (FDD)). If a new data indicator (NDI) bit in the second uplink grant 413 is set to "retransmission", the base station 404 may trigger a retransmission of a data packet 415a from the CSS.

In a second example embodiment, there may be no relationship between the first uplink grant 409a (e.g., in the CSS) and the second uplink grant 413 (e.g., in the USS). The first uplink grant 409a in the CSS may trigger a new transmission at the UE 406. For example, as seen in FIG. 4B, the UE 406 may select 417 a first uplink HARQ process based on the first uplink grant 409a, and transmit a first data packet 419 associated with the first uplink HARQ process using resources allocated by the first uplink grant 409a. In addition, the UE 406 may remove 421 the first uplink HARQ process from the set of HARQ processes in CSS and/or USS (e.g., and select a second uplink HARQ process that is different than the first uplink HARQ process), and transmit a second data packet 423 associated with a second uplink HARQ process using resources allocated by the second uplink grant 413.

In a first scenario of the second example embodiment, there may be a number of UL HARQ processes reserved for the first uplink grant 409a in the CSS (e.g., use HARQ0 for CSS). In one configuration, the number of UL HARQ processes reserved for the first uplink grant 409a in the CSS may be reused for the second uplink grant 413 in the USS (e.g., HARQ0). In another configuration, the number of reserved UL HARQ processes may be exclusive to the CSS. For example, if HARQ0 has pending asynchronous UL HARQ processes the UE 406 may discard HARQ0 for the second uplink grant 413 in the USS, and choose another HARQ process for the second data packet 423 transmitted using resources allocated by the second uplink grant 413.

In a second scenario of the second example embodiment, if the UE 406 receives the first uplink grant 409a in the CSS, the UE 406 may select a first UL HARQ process to flush based on implementation at the UE 406. For example, the first UL HARQ process (e.g., HARQ0) selected by the UE 406 may be part of a set of HARQ processes (e.g., HARQ0, HARQ1, HARQ2, HARQ3, HARQ4, HARQ5, HARQ6, HARQ7). In one aspect, the first UL HARQ processes may be associated with (e.g., reserved) for the CSS. In the second scenario, the UE 406 may remove 421 (e.g., flush) the first HARQ process from the set of HARQ processes in the CSS and/or USS (e.g., HARQ0 is removed), and transmit a start a new HARQ process (e.g., HARQ1, HARQ2, HARQ3, HARQ4, HARQ5, HARQ6, or HARQ7) with the first data packet 419 using the first uplink grant 409a.

In a third example embodiment, a first group of HARQ processes (e.g., HARQ0, HARQ1, HARQ2, HARQ3, HARQ4, HARQ5, HARQ6, HARQ7) may be associated with the first uplink grant 409a (e.g., the CSS) and a second group of HARQ processes (e.g., HARQ8, HARQ9, HARQ10, HARQ11, HARQ12, HARQ13, HARQ14, HARQ15) may be associated with the second uplink grant 413 (e.g., the USS). That is, the first uplink grant 409a received in the CSS may trigger a transmission using a HARQ process from the first group of HARQ processes (e.g., HARQ0, HARQ1, HARQ2, HARQ3, HARQ4, HARQ5, HARQ6, HARQ7) using resources allocated by the first uplink grant 409a. In addition, the second uplink grant 413 received in the USS may trigger a transmission using a different HARQ process from the second group of HARQ processes (e.g., HARQ8, HARQ9, HARQ10, HARQ11, HARQ12, HARQ13, HARQ14, HARQ15) using resources allocated by the second uplink grant 413.

For example, with respect to the third example embodiment, the UE 406 may transmit a first data packet 419 associated with a first set of uplink HARQ processes (e.g., HARQ0, HARQ1, HARQ2, HARQ3, HARQ4, HARQ5, HARQ6, HARQ7) using the first uplink grant 409a. In an aspect, the first set of uplink HARQ processes may be associated with synchronous HARQ. In addition, the UE 406 may transmit a second data packet 423 associated with a second set of uplink HARQ processes (e.g., HARQ8, HARQ9, HARQ10, HARQ11, HARQ12, HARQ13, HARQ14, HARQ15) using the second uplink grant 413. In an aspect, the second set of the uplink HARQ processes may be associated with the asynchronous HARQ.

A first property of VoLTE and/or uplink video transmissions is that the data packets of a predetermined size may be transmitted at regular intervals (e.g., 20 ms) by the base station 404. A second property of VoLTE and/or uplink video transmissions is that the data packets may be delivered from the UE 406 to the base station 404 within a given delay (e.g., 80 ms). Due to the first and second properties, SPS of the VoLTE and/or uplink video transmissions by the base station 404 may be a good option to reduce the downlink control overhead of the wireless communications system. However, some changes to SPS may be needed to enable VoLTE and/or uplink video transmissions from a UE 406 configured in VoLTE mode.

In a fourth example embodiment, the base station 404 may transmit a plurality of SPS grants 409b each associated with one or more of a different number of repetitions, a different uplink HARQ ID, a different modulation and coding scheme (MCS), and/or a different resource allocation. The fourth example embodiment may be useful when the base station 404 expects (i.e., is configured to receive) that different packet sizes (e.g., different types of video packets, such as packets containing I-frames, P-frames or B-frames) will arrive from the UE 406 at predetermined times.

In a fifth example embodiment, either the first uplink grant 409a and/or the second uplink grant 413 may include one or more SPS grants, and separate SPS grants 409b may not be transmitted. In one aspect, each of the one or more SPS grants may include multiple uplink HARQ IDs, and each one of the multiple uplink HARQ IDs may be associated with a different subframe.

Still referring to the fifth example embodiment, the base station 404 may include information associated with a C-RNTI in a transmission of one of the plurality of SPS grants (e.g., in either the first uplink grant 409a and/or the second uplink grant 413). Additionally and/or alternatively, the C-RNTI may be communicated to the UE 406 via separate signaling (e.g., not illustrated in FIGS. 4A-4C). Based on the C-RNTI and/or the SPS C-RNTI, the UE 406 may retransmit a data packet 415b associated with the one of the plurality of SPS grants included in the first uplink grant 409a and/or the second uplink grant 413.

For VoLTE, one data packet may be transmitted by the UE 406 at predetermined intervals (e.g., once every 20 ms). The maximum delay for a data packet reaching the base station 404 may be, for example, 80 ms. Hence, the base station 404 may benefit from receiving different HARQ processes (e.g., HARQ0, HARQ1, HARQ2, HARQ3, HARQ4, HARQ5, HARQ6, HARQ7) for the data packets arriving at different time instants. For example, packets arriving at 0, 80, 160 ms can use HARQ0, packets arriving at 20, 100, 180 ms can use HARQ1, etc. By receiving different HARQ processes at different times, the overhead associated with the first transmission of each data packet by the UE 406 may be reduced. In addition, subsequent retransmissions of data packets associated with the same HARQ processes may be enabled in a flexible way. For example, a retransmission may be triggered by DCI0, DCI0A, an SPS C-RNTI, or a C-RNTI.

One of the benefits of asynchronous UL HARQ transmissions may be that the base station 404 may dynamically "fill" unused resources for further retransmission of real time data packets by the UE 406. Dynamically "filling" unused resources may increase system reliability and reduce a delay in retransmissions being received by the base station 404. For example, using synchronous UL HARQ transmissions, the base station 404 may have to process a data packet for one HARQ process before the UE 406 is able to retransmit the data packet when the data packet it is not properly received and/or decoded by the base station 404. However, if asynchronous HARQ is used, then the base station 404 may schedule a "retransmission" while processing the current uplink data transmission (e.g., PUSCH transmission) from the UE 406, or before the uplink data transmission is received at the base station 404. For example, if the base station 404 provides a first uplink grant 409a to the UE 406 in subframe n, and in subframe n+2 the base station 404 receives SRS, and determines that the data associated with the first uplink grant 409a may not be received successfully (e.g. due to low SNR condition), the base station 404 may send a new uplink grant 425 to the UE 406 at subframe n+4 based on the SRS.

In a sixth example embodiment, the base station 404 may transmit the new uplink grant 425 to trigger a retransmission of a data packet 427 at the UE 406. In an aspect, the new uplink grant 425 may be transmitted by the base station 404 before the data packet 419 is finished being transmitted from the UE 406 to the base station 404. Additional details associated with "filling" unused resources for further retransmission of real time data packets by the UE 406 are discussed infra with respect to FIG. 5.

Depending on the operating signal-to-noise SNR of the wireless communications system, the optimum overhead of a pilot pattern (e.g., demodulation reference signals (DMRS)) of a data packet 419, 423 may be different. For example, in a low SNR scenario, the data packets 419, 423 may need more DMRS in the pilot pattern. In one aspect, the parameters (e.g., density, position, cyclic shift, etc.) of the pilot pattern may depend on at least one of a number of repetitions used for the PUSCH, whether the data packet is transmitted using an SPS grant, and/or the fact that different repetitions may have different pilot patterns (e.g., for four repetitions, the first subframe may have a higher DMRS density).

In a seventh example embodiment, the second RRC message 405 may include information associated with a number of repetitions used for the PUSCH (e.g., data transmission). As seen in FIG. 4C, the UE 406 may determine 429 to change a pilot pattern associated with a data transmission based on the information associated with the number of repetitions used for the PUSCH. In addition, the UE 406 may change 431 a number of DMRS in the data packet, and transmit the data packet 433 with the changed DMRS.

Using the aspects of the flow diagram 400 described supra, the present disclosure may be able to increase the reliability and reduce delay of VoLTE and/or video uplink data packets being correctly received by the base station 404.

Figure 5:
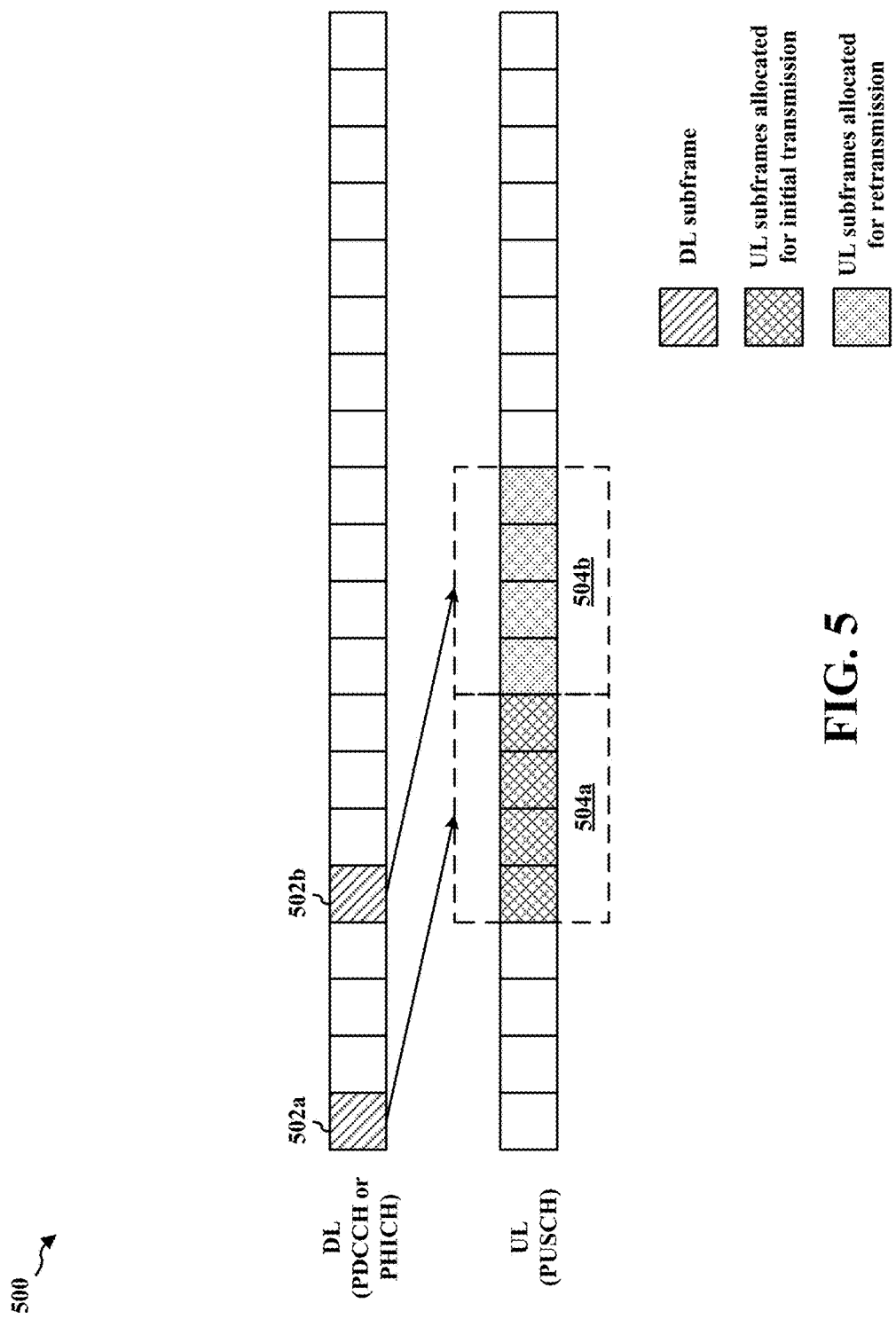
FIG. 5 a diagram illustrating an asynchronous HARQ retransmission mechanism in accordance with certain aspects of the disclosure.

FIG. 5 is a diagram illustrating an asynchronous HARQ retransmission mechanism 500 in accordance with certain aspects of the disclosure. For example, the asynchronous HARQ retransmission mechanism 500 may be implemented with respect to the sixth example embodiment discussed supra with respect to FIGS. 4A-4C.

With respect to FIG. 5, an uplink grant may be transmitted by base station 404 in downlink subframe 502a. For example, the uplink grant may schedule a predetermined number of uplink subframes 504a to the UE 406 for uplink data transmissions (e.g., VoLTE and/or video uplink data packets) or may include a number of repetitions (i.e., 4 repetitions=4 subframes).

Using asynchronous HARQ, the base station 404 may transmit a different uplink grant (e.g., in downlink subframe 502b) that schedules additional UL subframes 504b (e.g., before the UL transmissions in subframes 504b are processed and/or received by the base station 404) to the UE 406 that may be used for sending retransmissions of the uplink data packets scheduled in 504a. Hence, the reliability of uplink data packets being properly received by the base station 404 may be increased. In addition, uplink subframes may be scheduled for retransmission without a delay caused by processing of the uplink data packets at the base station 404.

Figure 6A:
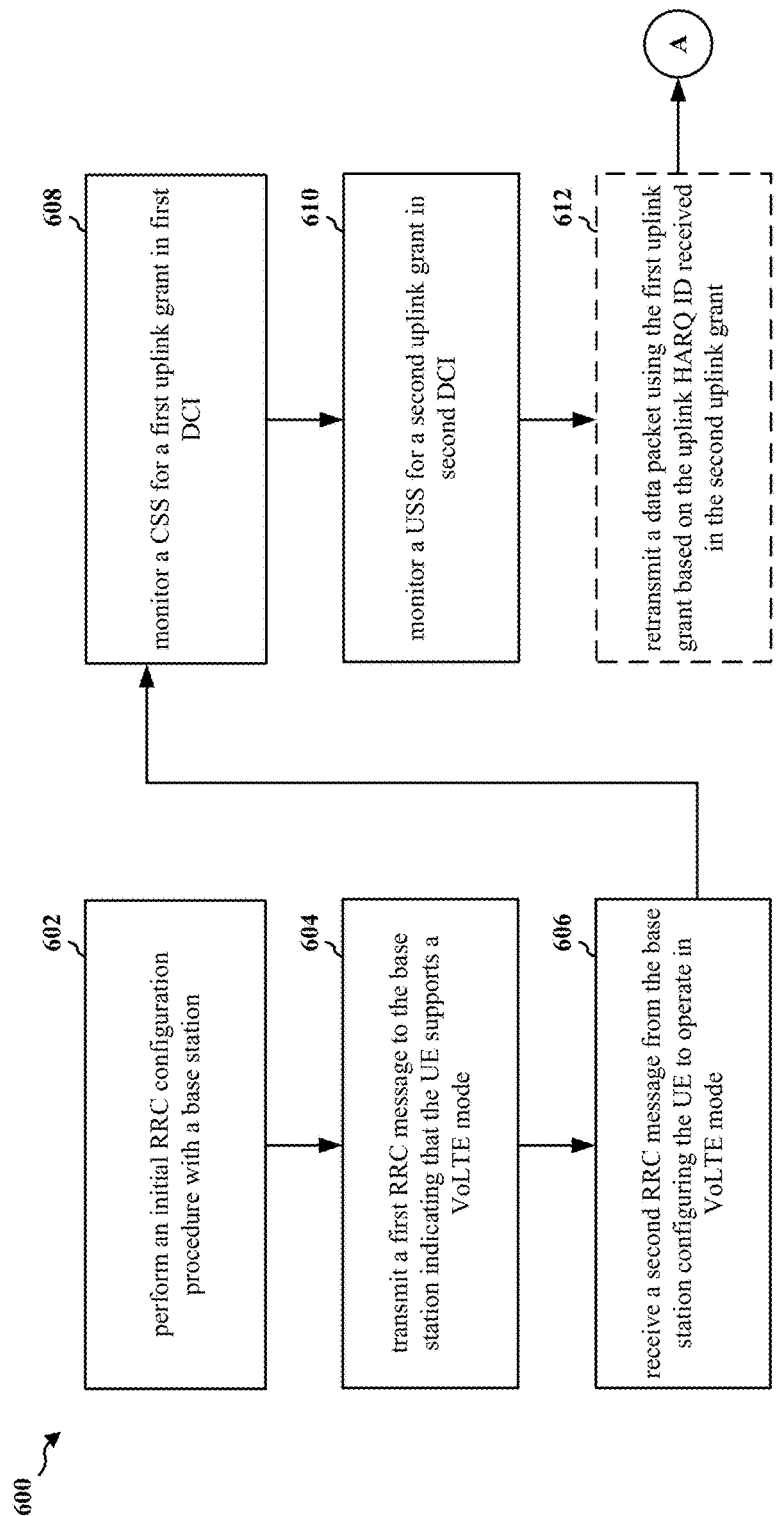
FIGS. 6A-6C are a flowchart of a method of wireless communication.
Figure 6B:
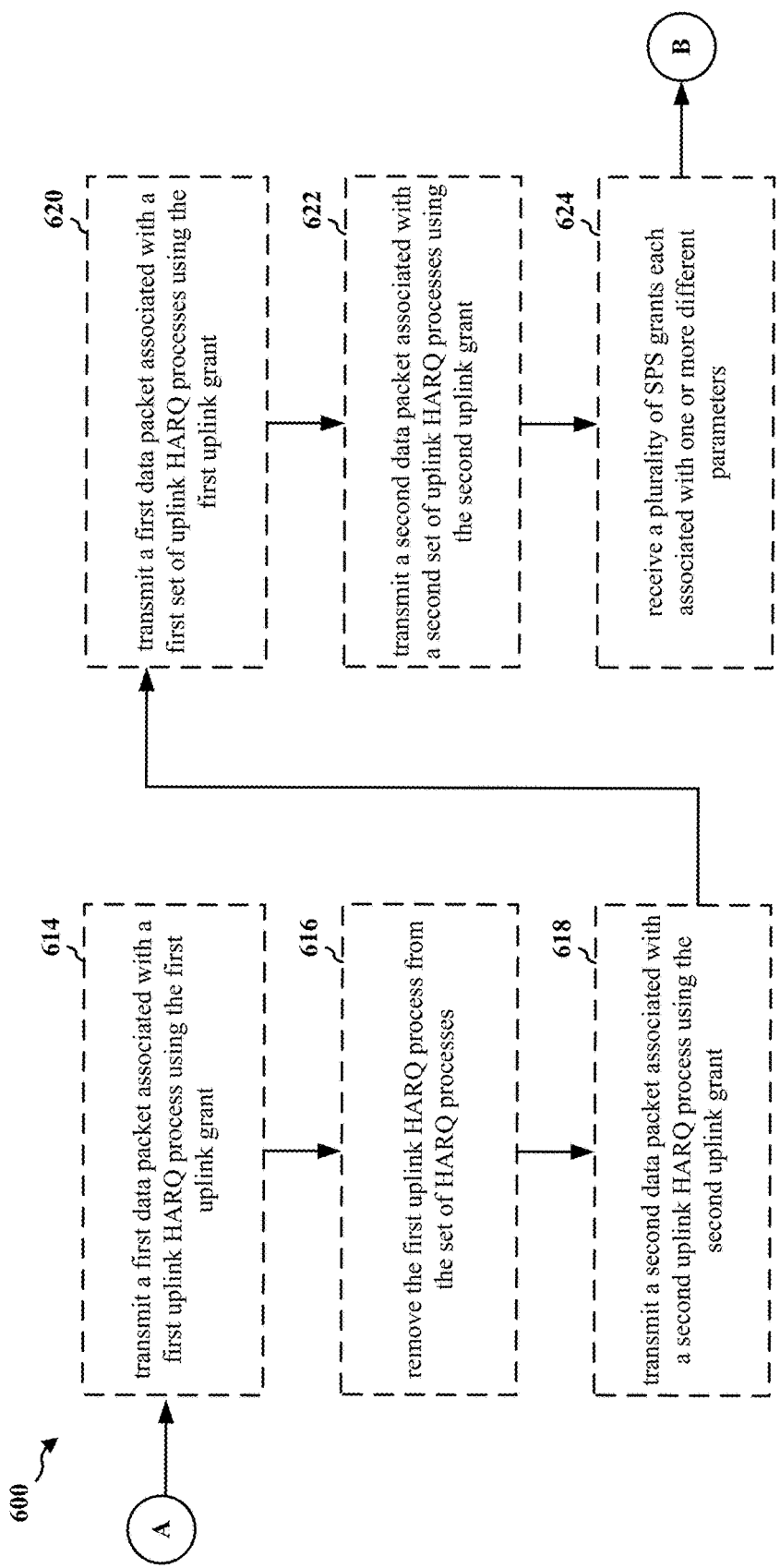
Figure 6C:
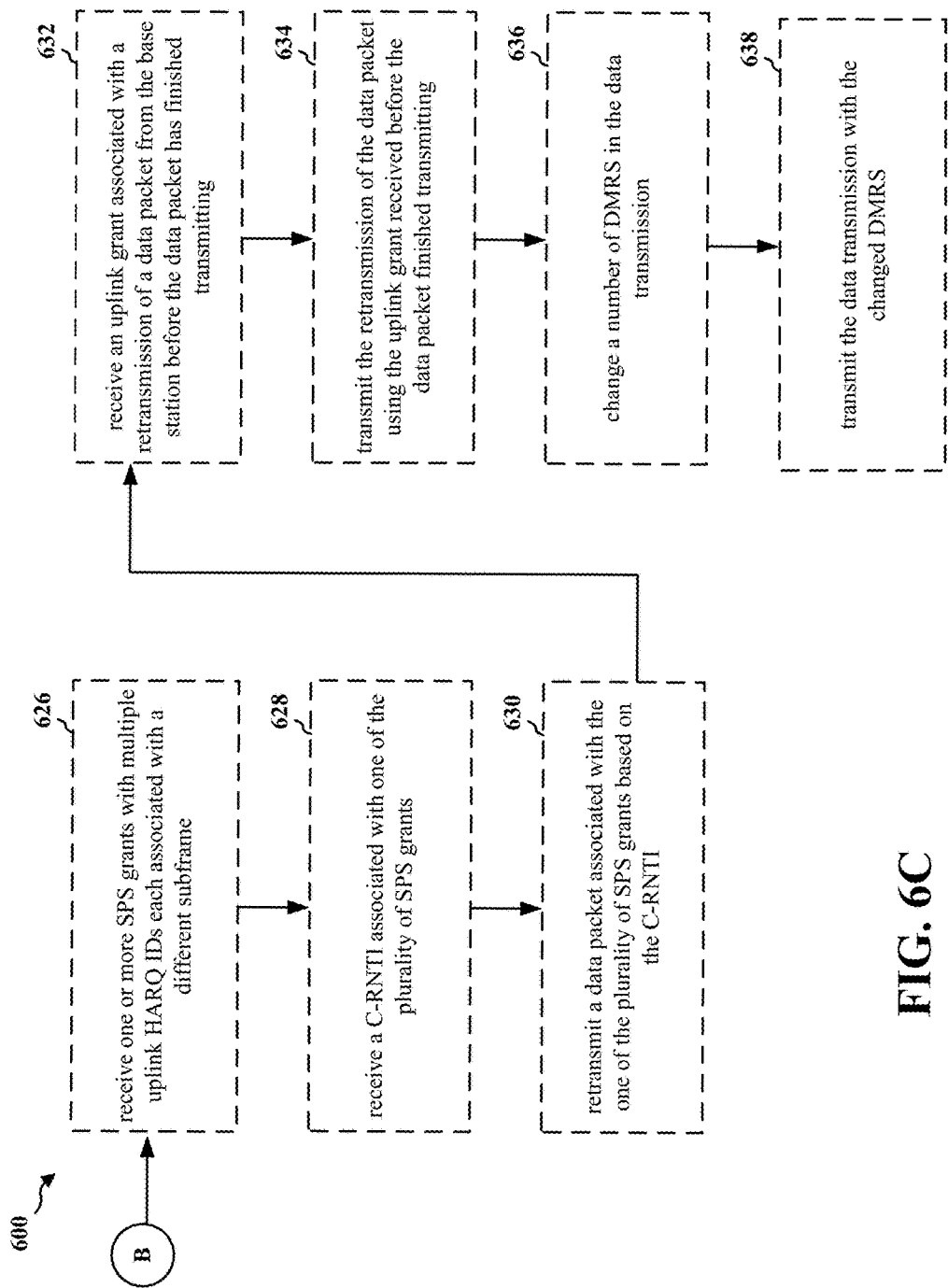

FIGS. 6A-6C are a flowchart 600 of a method of wireless communication. The method may be performed by a UE (e.g., the UE 104, 350, 406, 1050, apparatus 702/702') in communication with a base station (e.g., the base station 102, 180, 404, 750, eNB 310, apparatus 1002/1002'). In FIGS. 6A-6C, operations indicated with dashed lines may represent optional operations for various aspects of the disclosure.

As seen in FIG. 6A, at 602, the UE may perform an initial RRC configuration procedure with a base station. For example, referring to FIGS. 4A-4C, the UE 406 may perform an initial RRC configuration procedure 401 with the base station 404.

At 604, the UE may transmit a first RRC message to the base station. In an aspect, the first RRC message may indicate that the UE supports a VoLTE mode. For example, referring to FIGS. 4A-4C, once the initial RRC configuration procedure 401 is complete, the UE 406 may transmit a first RRC message 403 to the base station 404. In one aspect, the first RRC message 403 may indicate to the base station 404 that the UE 406 supports a VoLTE mode or video enhancements (e.g., the UE 406 may be able to support asynchronous UL HARQ transmissions and/or bundled transmissions).

At 606, the UE may receive a second RRC message from the base station. In an aspect, the second RRC message may configure the UE to operate in VoLTE mode. For example, referring to FIGS. 4A-4C, the UE 406 may be configured in VoLTE mode when a second RRC message 405 is received by the UE 406. In an aspect, the UE 406 may be configured in VoLTE mode when a mode change indication is included in the second RRC message 405. Additionally and/or alternatively, the VoLTE mode may include one or more of a number of HARQ processes for asynchronous UL HARQ operation, a maximum number of repetitions (e.g., the number of repetitions that may be signaled in an UL grant) of a data transmission that may be sent by the UE 406, and/or the actual number of repetitions of a data transmission that may be sent by the UE 406.

At 608, the UE may monitor a CSS for a first uplink grant in first DCI. In an aspect, the first uplink grant may be associated with synchronous HARQ. In a further aspect, the first uplink grant may contain an uplink HARQ ID field. For example, referring to FIGS. 4A-4C, the UE 406 may monitor 407 a first search space for a first uplink grant 409a. For example, the first search space may be a CSS. In the CSS, the UE 406 may monitor 407 DCI0 (e.g., the DCI format that may be used to carry UL grants) and DCI1A (e.g., one DCI format that may be used to carry DL scheduling). In an aspect, DCI0 in the CSS may be used to carry a first uplink grant 409a. The first uplink grant 409a may not contain a UL HARQ ID, and may be associated with synchronous UL HARQ. In synchronous UL HARQ, the retransmission(s) for each HARQ process (e.g., HARQ0, HARQ1, HARQ2, HARQ3, HARQ4, HARQ5, HARQ6, HARQ7) may be sent by the UE 406 at predetermines times relative to the initial transmission. Hence, the base station 404 may not need to signal the UL HARQ ID in the first uplink grant 409a because the UE 406 may infer the HARQ process to be retransmitted based on the transmission timing (e.g., associated with the initial data transmission). Using the subframe number and the frame number, the UE 406 may use UL HARQ IDs for synchronous UL HARQ.

At 610, the UE may monitor a USS for a second uplink grant in second DCI. In an aspect, the second uplink grant may include a HARQ ID associated with asynchronous uplink HARQ. For example, referring to FIGS. 4A-4C, the UE 406 may monitor 411 a second search space for a second uplink grant 413. For example, the second search space may be a USS. In an aspect, the UE 406 may monitor 411 the USS for a different DCI grant (e.g., a modified DCI0 or a new grant DCI0A) that includes a UL HARQ ID and may be associated with asynchronous UL HARQ. In asynchronous UL HARQ, retransmission(s) for each HARQ process (e.g., HARQ0, HARQ1, HARQ2, HARQ3, HARQ4, HARQ5, HARQ6, HARQ7) may be triggered by the UL HARQ ID that is included in the second uplink grant 413. Asynchronous UL HARQ may increase the flexibility of the communication system because retransmission(s) may not need to be scheduled as in synchronous UL HARQ. In addition, the second uplink grant 413 may also include the number of repetitions, if maximum number of repetitions is signaled by the second RRC message 405. Still further, the first uplink grant 409a and the second uplink grant 413 may be the same size (e.g., allocate the same number of resources to UE 406).

At 612, the UE may retransmit a data packet using the first uplink grant based on the uplink HARQ ID received in the second uplink grant. In an aspect, the uplink HARQ ID for the first uplink grant may be based at least on a subframe number in which the first uplink grant is received. For example, referring to FIGS. 4A-4C, there may be an explicit relationship between the "synchronous HARQ ID" (e.g., inferred by the UE 406 based on the subframe number in which the first uplink grant 409a is received) and the "asynchronous HARQ ID" (e.g., which is signaled in the second uplink grant 413). For example, the UE 406 may retransmit a data packet 415a using resources allocated in the first uplink grant 409a based on the uplink HARQ ID received in the second uplink grant 413. In one aspect, the uplink HARQ ID for the first uplink grant 409a may be based on a subframe number in which the first uplink grant 409a is received (e.g., for FDD). If an NDI bit in the second uplink grant 413 is set to "retransmission", the base station 404 may trigger a retransmission of a data packet 415a from the CSS.

As seen in FIG. 6B, at 614, the UE may transmit a first data packet associated with the first uplink HARQ process using the first uplink grant. For example, referring to FIGS. 4A-4C, there may be no relationship between the first uplink grant 409a (e.g., in the CSS) and the second uplink grant 413 (e.g., in the USS). The first uplink grant 409a in the CSS may trigger a new transmission at the UE 406. In an aspect, the UE 406 may select 417 a first uplink HARQ process based on the first uplink grant 409a, and transmit a first data packet 419 associated with the first uplink HARQ process using resources allocated by the first uplink grant 409a.

At 616, the UE may remove the first uplink HARQ process from the set of HARQ processes. For example, referring to FIGS. 4A-4C, if HARQ0 has pending asynchronous UL HARQ processes the UE 406 may remove 421 HARQ0 for the second uplink grant 413 in the USS.

At 618, the UE may transmit a second data packet associated with the second uplink HARQ process using the second uplink grant. For example, referring to FIGS. 4A-4C, if HARQ0 has pending asynchronous UL HARQ processes the UE 406 may remove 421 HARQ0 for the second uplink grant 413 in the USS, and choose another HARQ process (e.g., HARQ1, HARQ2, HARQ3, HARQ4, HARQ5, HARQ6, or HARQ7) for the second data packet 423 transmitted using resources allocated by the second uplink grant 413.

At 620, the UE may transmit a first data packet associated with a first set of uplink HARQ processes using the first uplink grant. In an aspect, the first set of the uplink HARQ processes may be associated with uplink synchronous HARQ. For example, referring to FIGS. 4A-4C, the UE 406 may transmit a first data packet 419 associated with a first set of uplink HARQ processes (e.g., HARQ0, HARQ1, HARQ2, HARQ3, HARQ4, HARQ5, HARQ6, HARQ7) using the first uplink grant 409a.

At 622, the UE may transmit a second data packet associated with a second set of uplink HARQ processes using the second uplink grant. In an aspect, the second set of the uplink HARQ processes may be associated with the asynchronous HARQ. For example, referring to FIGS. 4A-4C, the UE 406 may transmit a second data packet 423 associated with a second set of uplink HARQ processes (e.g., HARQ8, HARQ9, HARQ10, HARQ11, HARQ12, HARQ13, HARQ14, HARQ15) using the second uplink grant 413.

At 624, the UE may receive a plurality of SPS grants each associated with one or more of a different number of repetitions, a different uplink HARQ ID, or a different resource allocation. For example, referring to FIGS. 4A-4C, the UE 406 may receive a plurality of SPS grants 409b from the base station 404. In one aspect, each of the plurality of SPS grants 409b may be associated with one or more of a different number of repetitions, a different uplink HARQ ID, a different MCS, and/or a different resource allocation. The base station 404 may transmit a plurality of SPS grants 409b, for example, when the base station 404 expects (i.e., is configured to receive) that different packet sizes (e.g., different types of video packets) will arrive from the UE 406 at predetermined times.

As seen in FIG. 6C, at 626, the UE may receive one or more SPS grants with multiple uplink HARQ IDs. In one aspect, each one of the multiple uplink HARQ IDs may be associated with a different subframe. For example, referring to FIGS. 4A-4C, SPS grants may be included in either the first uplink grant 409a and/or the second uplink grant 413, and separate SPS grants 409b may not be transmitted. In one aspect, each of the one or more SPS grants included in the first uplink grant 409a and/or the second uplink grant 413 may include multiple uplink HARQ IDs, and each one of the multiple uplink HARQ IDs may be associated with a different subframe.

At 628, the UE may receive a C-RNTI associated with one of the plurality of SPS grants. For example, referring to FIGS. 4A-4C, the base station 404 may include information associated with a C-RNTI in a transmission of one of the plurality of SPS grants (e.g., in the first uplink grant 409a and/or the second uplink grant 413) that is received by the UE 406. Additionally and/or alternatively, the C-RNTI may be communicated to the UE 406 via separate signaling (e.g., not illustrated in FIGS. 4A-4C).

At 630, the UE may retransmit a data packet associated with the one of the plurality of SPS grants based on the C-RNTI. For example, referring to FIGS. 4A-4C, based on the C-RNTI and/or the SPS C-RNTI, the UE 406 may retransmit a data packet 415b associated with the one of the plurality of SPS grants 409b.

At 632, the UE may receive an uplink grant associated with a retransmission of a data packet from the base station. In an aspect, the uplink grant may be received before the data packet has finished being transmitted to the base station. For example, referring to FIGS. 4A-4C, the base station 404 may transmit the new uplink grant 425 that may be received by the UE 406 and triggers a retransmission of a data packet 427 at the UE 406. In an aspect, the new uplink grant 425 may be received by the UE 406 before the data packet 419 is finished being transmitted from the UE 406 to the base station 404. Additional details associated with "filling" unused resources for further retransmission of real time data packets by the UE 406 are discussed supra with respect to FIG. 5.

At 634, the UE may transmit the retransmission of the data packet using the uplink grant received before the data packet finished transmitting. For example, referring to FIGS. 4A-4C, the base station 404 may transmit the new uplink grant 425 to trigger a retransmission of a data packet 427 at the UE 406. In an aspect, the new uplink grant 425 may be transmitted by the base station 404 before the data packet 419 is finished being transmitted from the UE 406 to the base station 404. Additional details associated with "filling" unused resources for further retransmission of real time data packets by the UE 406 are discussed supra with respect to FIG. 5.

At 636, the UE may change a number of DMRS in the data packet. For example, referring to FIGS. 4A-4C, the second RRC message 405 may include information associated with a number of repetitions used for the PUSCH. Here, the UE 406 may determine 429 to change a pilot pattern associated with a data transmission based on the information associated with the number of repetitions used for the PUSCH. The UE 406 may change 431 a number of DMRS in the data packet.

At 638, the UE may transmit the data packet with the changed DMRS. For example, referring to FIGS. 4A-4C, the UE 406 may transmit the data packet 433 with the changed DMRS.

Figure 7:
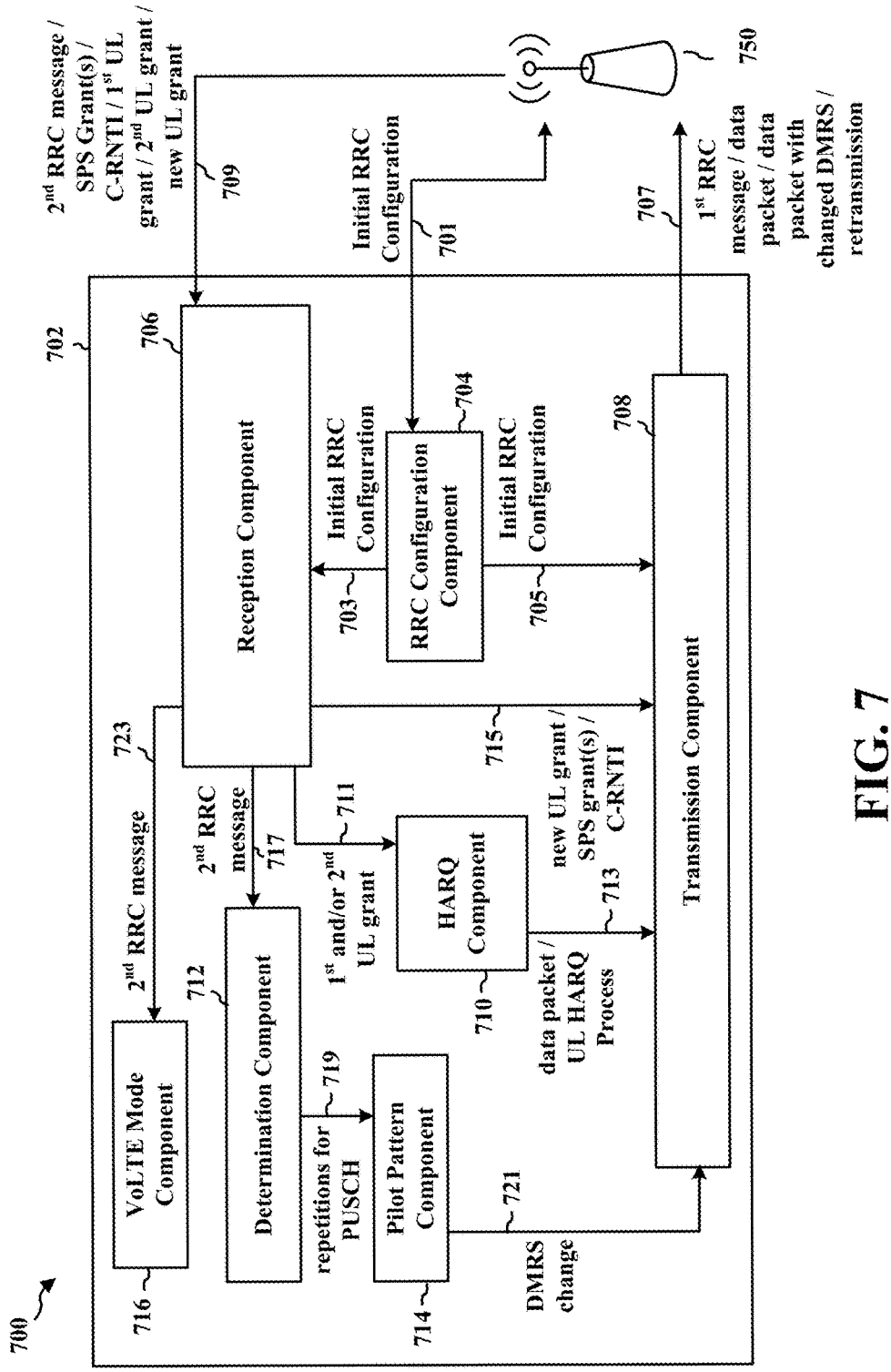
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a UE (e.g., the UE 104, 350, 406, 1050, apparatus 702/702') in communication with a base station 750 (e.g., the base station 102, 180, 404, eNB 310, apparatus 1002/1002'). The apparatus may include an RRC configuration component 704, a reception component 706, a transmission component 708, a HARQ component 710, a determination component 712, a pilot pattern component 714, and a VoLTE mode component 716. The RRC configuration component 704 may be configured to perform an initial RRC configuration procedure 701 with the base station 750. In one aspect, the RRC configuration component 704 may send a signal 703, 705 associated with the initial RRC configuration procedure to the reception component 706 and/or the transmission component 708, respectively. The transmission component 708 may be configured to transmit a first RRC message 707 to the base station 750. In an aspect, the first RRC message may indicate that the apparatus 702 supports a VoLTE mode. The reception component 706 may be configured to receive a second RRC message 709 from the base station 750. In an aspect, the second RRC message may configure the apparatus 702 to operate in VoLTE mode. The reception component 706 may send a signal 717, 723 associated with the second RRC message to the determination component 712 and/or the VoLTE mode component 716, respectively. The VoLTE mode component 716 may be configured to configure the apparatus in VoLTE mode. In addition, the reception component 706 may be configured to monitor a CSS for a first uplink grant 709 in first DCI. In an aspect, the first uplink grant 709 may be associated with synchronous HARQ. In a further aspect, the first uplink grant 709 may contain an uplink HARQ ID field. The reception component 706 may be configured to monitor a USS for a second uplink grant 709 in second DCI. In an aspect, the second uplink grant 709 may include a HARQ ID associated with asynchronous uplink HARQ. Further, the reception component 706 may send a signal 711 associated with one or more of the first uplink grant 709 and/or the second uplink grant 709 to the HARQ component 710. The HARQ component 710 may be configured to determine one or more of a data packet for retransmission based on the uplink HARQ ID in the second uplink grant 709, a data packet associated with the a first uplink HARQ process, a second data packet associated with a second HARQ, a data packet associated with a first set of HARQ processes, and/or another data packet associated with a second set of HARQ processes. In addition, the HARQ component 710 may send a signal 713 associated with one or more of the data packet for retransmission based on the uplink HARQ ID in the second uplink grant, the data packet associated with the a first uplink HARQ process, the second data packet associated with a second HARQ, the data packet associated with a first set of HARQ processes, and/or the another data packet associated with a second set of HARQ processes to the transmission component 708. The transmission component 708 may be configured to retransmit a data packet using the first uplink grant based on the uplink HARQ ID received in the second uplink grant. In an aspect, the uplink HARQ ID for the first uplink grant may be based at least on a subframe number in which the first uplink grant 709 is received. The transmission component 708 may also be configured to transmit a first data packet associated with the first uplink HARQ process using the first uplink grant 709. In another aspect, the HARQ component 710 may be configured to remove the first uplink HARQ process from the set of HARQ processes. The transmission component 708 may be further configured to transmit a second data packet associated with the second uplink HARQ process using the second uplink grant 709. Additionally, the transmission component 708 may be configured to transmit a first data packet associated with a first set of uplink HARQ processes using the first uplink grant 709. In an aspect, the first set of the uplink HARQ processes may be associated with uplink synchronous HARQ. Further, the transmission component 708 may be configured to transmit a second data packet associated with a second set of uplink HARQ processes using the second uplink grant 709. In an aspect, the second set of the uplink HARQ processes may be associated with the asynchronous HARQ. The reception component 706 may be configured to receive a plurality of SPS grants 709 each associated with one or more of a different number of repetitions, a different uplink HARQ ID, or a different resource allocation. Additionally and/or alternatively, the reception component 706 may be configured to receive one or more SPS grants 709 with multiple uplink HARQ IDs. In one aspect, each one of the multiple uplink HARQ IDs may be associated with a different subframe. In addition, the reception component 706 may be configured to receive a C-RNTI 709 associated with one of the plurality of SPS grants. Further, the reception component 706 may be configured to send a signal 715 associated with one of the SPS grant(s) and/or the C-RNTI to the transmission component 708. The transmission component 708 may be configured to retransmit a data packet associated with the one of the plurality of SPS grants based on the C-RNTI. Further, the reception component 706 may be configured to receive a new uplink grant 709 associated with a retransmission of a data packet from the base station 750. In an aspect, the new uplink grant 709 may be received before the data packet 707 has finished being transmitted from the transmission component 708 to the base station 750. The reception component 706 may send a signal 715 associated with the new UL grant to the transmission component 708. The transmission component 708 may be configured to transmit the retransmission 707 of the data packet using the new uplink grant received before the data packet (e.g., initial data packet) is finished transmitting. The determination component 712 may be configured to determine to change a pilot pattern associated with a data packet based on information associated with the number of repetitions used for a PUSCH when the second RRC message includes information associated with a number of repetitions used for a PUSCH. In addition, the determination component 712 may send a signal 719 associated with the number of repetitions used for the PUSCH and/or the change to the pilot pattern (e.g., DMRS) to the pilot pattern component 714. In addition, the pilot pattern component 714 may be configured to change a number of DMRS (e.g., pilot pattern) in a data packet. The pilot pattern component 714 may send a signal 721 associated with the change to the number of DMRS in the data packet to the transmission component 708. The transmission component 708 may the data packet 707 with the changed DMRS to the base station 750.

The apparatus may include additional components that perform each of the blocks of the algorithm in the aforementioned flowcharts of FIGS. 6A-6C. As such, each block in the aforementioned flowcharts of FIGS. 6A-6C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
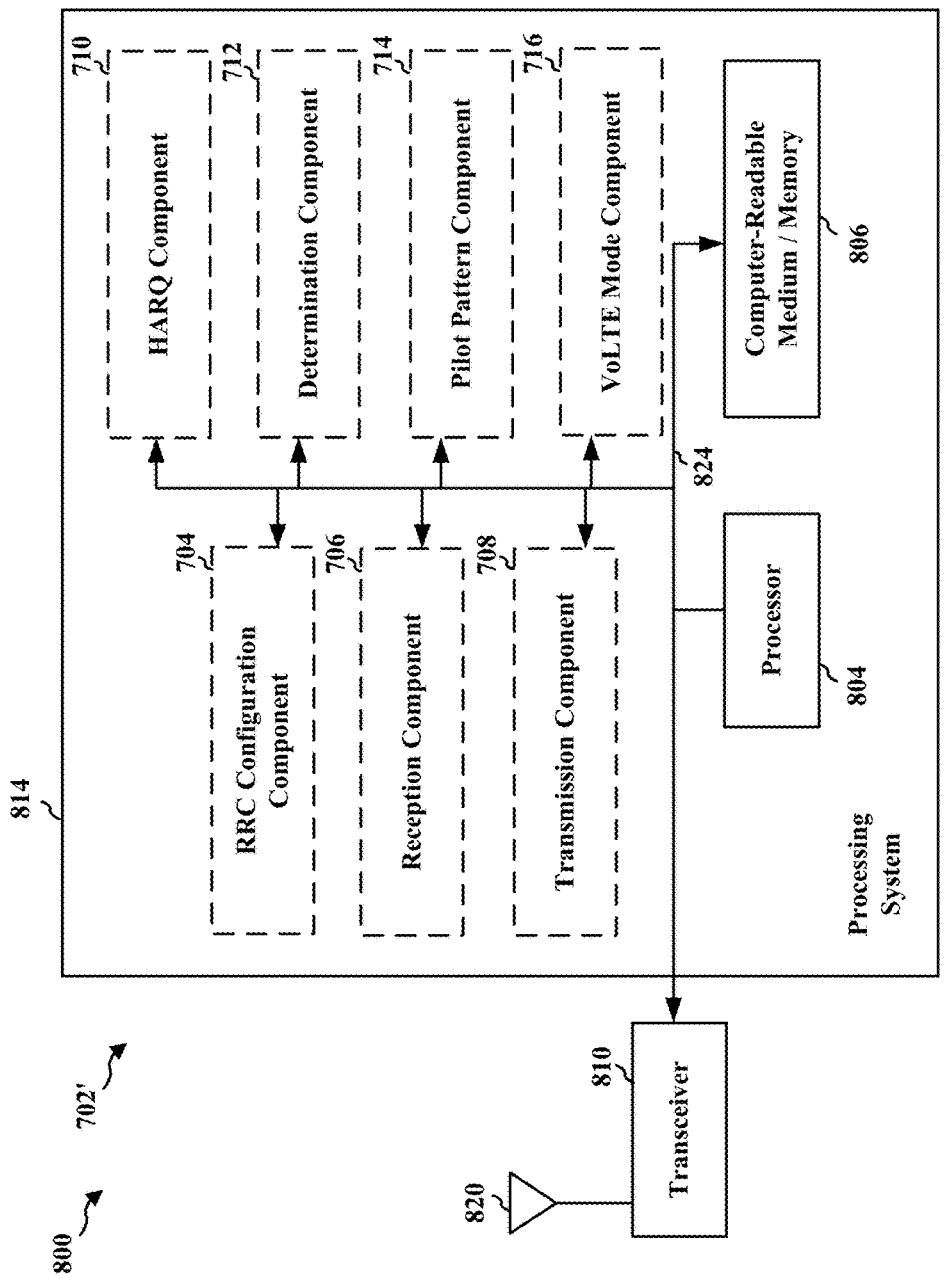
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, 716 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 706. In addition, the transceiver 810 receives information from the processing system 814, specifically the transmission component 708, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714, 716. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359.

In one configuration, the apparatus 702/702' for wireless communication may include means for performing an initial RRC configuration procedure with a base station. In another configuration, the apparatus 702/702' for wireless communication may include means for transmitting a first RRC message to the base station. In an aspect, the first RRC message may indicate that the UE supports a VoLTE mode. In a further configuration, the apparatus 702/702' for wireless communication may include means for receiving a second RRC message from the base station. In an aspect, the second RRC message may configure the UE to operate in VoLTE mode. In one configuration, the apparatus 702/702' for wireless communication may include means for monitoring a CSS for a first uplink grant DCI. In an aspect, the first uplink grant may be associated with synchronous HARQ. In a further aspect, the first uplink grant may contain an uplink HARQ ID field. In another configuration, the apparatus 702/702' for wireless communication may include means for monitoring a USS for a second uplink grant in second DCI. In an aspect, the second uplink grant may include a HARQ ID associated with asynchronous uplink HARQ. In a further configuration, the apparatus 702/702' for wireless communication may include means for retransmitting a data packet using the first uplink grant based on the uplink HARQ ID received in the second uplink grant. In an aspect, the uplink HARQ ID for the first uplink grant may be based at least on a subframe number in which the first uplink grant is received. In one configuration, the apparatus 702/702' for wireless communication may include means for transmitting a first data packet associated with the first uplink HARQ process using the first uplink grant. In another configuration, the apparatus 702/702' for wireless communication may include means for removing the first uplink HARQ process from the set of HARQ processes. In a further configuration, the apparatus 702/702' for wireless communication may include means for transmitting a second data packet associated with the second uplink HARQ process using the second uplink grant. In one configuration, the apparatus 702/702' for wireless communication may include means for transmitting a first data packet associated with a first set of uplink HARQ processes using the first uplink grant. In an aspect, the first set of the uplink HARQ processes may be associated with uplink synchronous HARQ. In another configuration, the apparatus 702/702' for wireless communication may include means for transmitting a second data packet associated with a second set of uplink HARQ processes using the second uplink grant. In an aspect, the second set of the uplink HARQ processes may be associated with the asynchronous HARQ. In a further configuration, the apparatus 702/702' for wireless communication may include means for receiving a plurality of SPS grants each associated with one or more of a different number of repetitions, a different uplink HARQ ID, or a different resource allocation. In one configuration, the apparatus 702/702' for wireless communication may include means for receive one or more SPS grants with multiple uplink HARQ IDs. In one aspect each one of the multiple uplink HARQ IDs may be associated with a different subframe. In another configuration, the apparatus 702/702' for wireless communication may include means for receiving a C-RNTI associated with one of the plurality of SPS grants. In another configuration, the apparatus 702/702' for wireless communication may include means for retransmitting a data packet associated with the one of the plurality of SPS grants based on the C-RNTI. In a further configuration, the apparatus 702/702' for wireless communication may include means for receiving an uplink grant associated with a retransmission of a data packet from the base station. In an aspect, the uplink grant may be received before the data packet has finished being transmitted to the base station. In another configuration, the apparatus 702/702' for wireless communication may include means for transmitting the retransmission of the data packet using the uplink grant received before the data packet finished transmitting. In one configuration, the apparatus 702/702' for wireless communication may include means for determining to change a pilot pattern associated with a data packet based on information associated with the number of repetitions used for a PUSCH when the second RRC message includes information associated with a number of repetitions used for a PUSCH. In another configuration, the apparatus 702/702' for wireless communication may include means for changing a number of DMRS in the data packet. In a further configuration, the apparatus 702/702' for wireless communication may include means for transmitting the data packet with the changed DMRS. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9A:
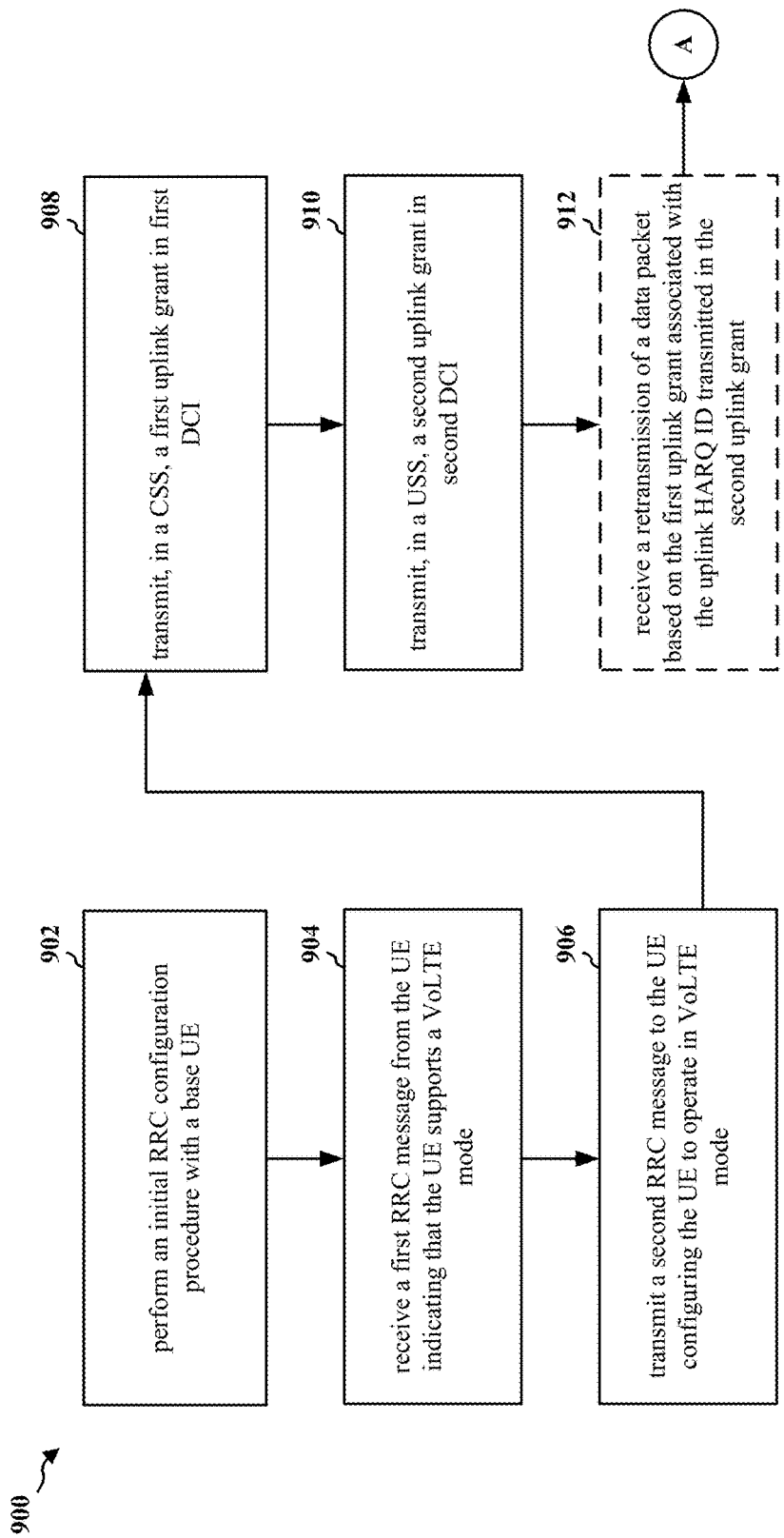
FIGS. 9A-9C are a flowchart of a method of wireless communication.
Figure 9B:
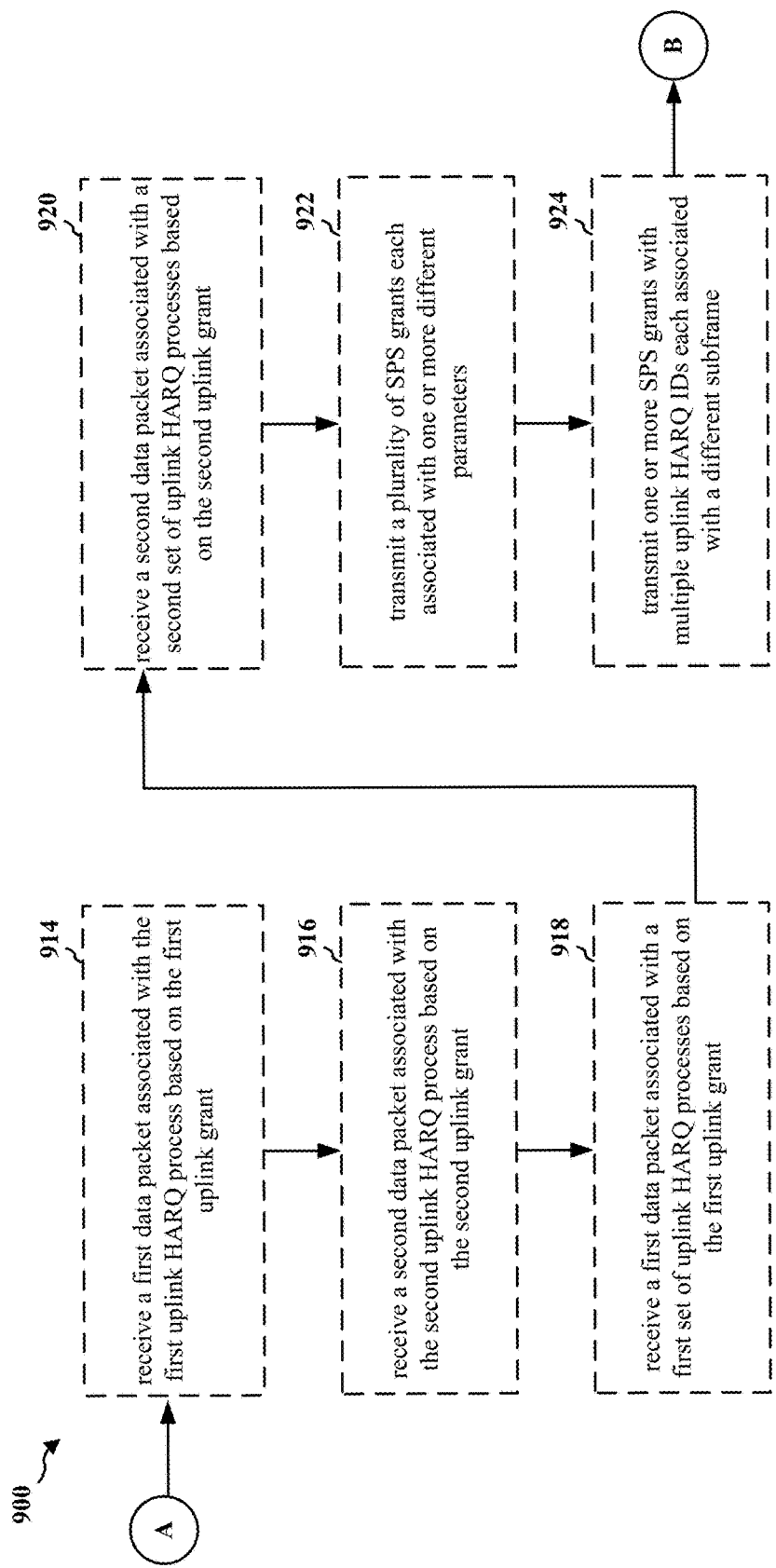
Figure 9C:
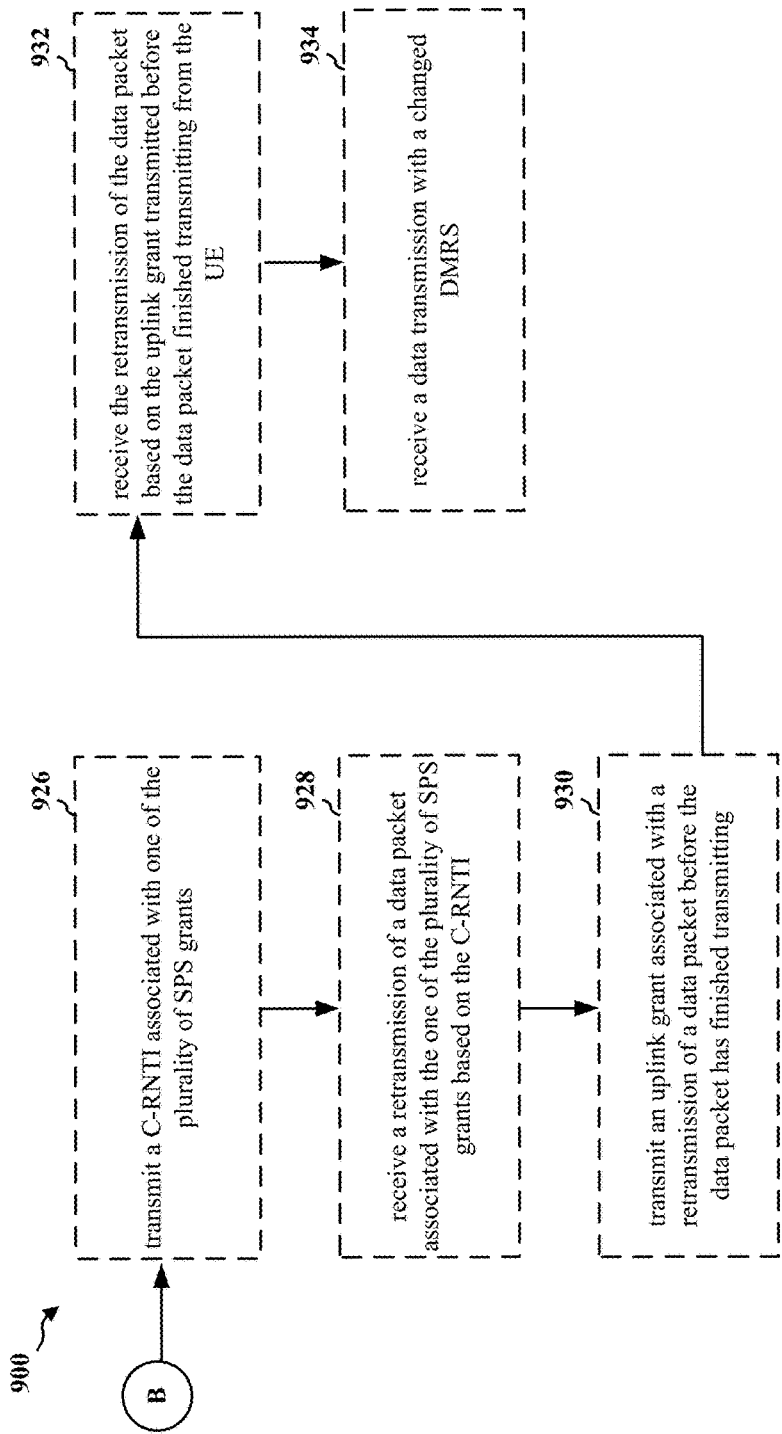

FIGS. 9A-9C are a flowchart 900 of a method of wireless communication. The method may be performed by a base station (e.g., the base station 102, 180, 404, 750, eNB 310, apparatus 1002/1002') in communication with a UE (e.g., the UE 104, 350, 406, 1050, apparatus 702/702'). In FIGS. 9A-9C, operations indicated with dashed lines may represent optional operations for various aspects of the disclosure.

As seen in FIG. 9A, at 902, the base station may perform an initial RRC configuration procedure with a UE. For example, referring to FIGS. 4A-4C, the base station 404 may perform an initial RRC configuration procedure 401 with the UE 406.

At 904, the base station may receive a first RRC message from the UE indicating that the UE supports a VoLTE mode. For example, referring to FIGS. 4A-4C, once the initial RRC configuration procedure 401 is complete, the UE 406 may transmit a first RRC message 403 that may be received by the base station 404. In one aspect, the first RRC message 403 may indicate to the base station 404 that the UE 406 supports a VoLTE mode or video enhancements (e.g., the UE 406 may be able to support asynchronous UL HARQ transmissions and/or bundled transmissions).

At 906, the base station may transmit a second RRC message to the UE configuring the UE to operate in VoLTE mode. For example, referring to FIGS. 4A-4C, the UE 406 may be configured in VoLTE mode when a second RRC message 405 transmitted by the base station 404 is received by the UE 406. In an aspect, the UE 406 may be configured in VoLTE mode when a "mode change indication" is included in the second RRC message 405. Additionally and/or alternatively, the VoLTE mode may include one or more of a number of HARQ processes for asynchronous UL HARQ operation, a maximum number of repetitions (e.g., the number of repetitions that may be signaled in an UL grant) of a data transmission sent by the UE 406, and/or the actual number of repetitions of a data transmission sent by the UE 406.

At 908, the base station may transmit, in a CSS, a first uplink grant in first DCI. In one aspect, the first uplink grant may contain an uplink HARQ ID field. For example, referring to FIGS. 4A-4C, the base station 404 may transmit a first uplink grant 409a in a first search space. For example, the first search space may be a CSS. In the CSS, the base station 404 may transmit the first uplink grant 409a using DCI0 (e.g., the DCI format that may be used to carry UL grants) and/or DCI1A (e.g., one DCI format that may be used to carry DL scheduling). In an aspect, DCI0 in the CSS may be used to carry a first uplink grant 409a. The first uplink grant 409a may not contain a UL HARQ identification (ID), and may be associated with synchronous UL HARQ. In synchronous UL HARQ, the retransmission(s) for each HARQ process (e.g., HARQ0, HARQ1, HARQ2, HARQ3, HARQ4, HARQ5, HARQ6, HARQ7) are transmitted by the base station 404 at predetermines times relative to the initial transmission. Hence, the base station 404 may not need to signal the UL HARQ ID in the first uplink grant 409a because the UE 406 may infer the HARQ process to be retransmitted from the transmission timing. Using the subframe number and the frame number, the UE 406 may use UL HARQ IDs for synchronous UL HARQ.

At 910, the base station may transmit, in a USS, a second uplink grant in second DCI. In an aspect, the second uplink grant may include an uplink HARQ ID associated with asynchronous uplink HARQ. example, referring to FIGS. 4A-4C, the base station 404 may transmit a second uplink grant 413 in a second search space. For example, the second search space may be a USS. In an aspect, the base station 404 may transmit the second uplink grant 413 in a modified DCI0 or a new grant DCI0A that includes a UL HARQ ID and may be associated with asynchronous UL HARQ. In asynchronous UL HARQ, retransmission(s) for each HARQ process (e.g., HARQ0, HARQ1, HARQ2, HARQ3, HARQ4, HARQ5, HARQ6, HARQ7) may be triggered by the UL HARQ ID that is included in the second uplink grant 413. Asynchronous UL HARQ may increase the flexibility of the communication system because retransmission(s) may not need to be scheduled as in synchronous UL HARQ. In addition, the second uplink grant 413 may also include the number of repetitions, if maximum number of repetitions is signaled by the second RRC message 405. Still further, the first uplink grant 409a and the second uplink grant 413 may be the same size (e.g., allocate the same number of resources to UE 406).

At 912, the base station may receive a retransmission of a data packet based on the first uplink grant associated with the uplink HARQ ID transmitted in the second uplink grant. In an aspect, the uplink HARQ ID for the first uplink grant may be based at least on a subframe number in which the first uplink grant is transmitted. For example, referring to FIGS. 4A-4C, there may be an explicit relationship between the "synchronous HARQ ID" (e.g., inferred by the UE 406 based on the subframe number in which the first uplink grant 409a is received) and the "asynchronous HARQ ID" (e.g., which is signaled in the second uplink grant 413). In one aspect, the UE 406 may retransmit a data packet 415a (e.g., that is received by the base station 404) using resources allocated in the first uplink grant 409a based on the uplink HARQ ID received in the second uplink grant 413. For example, the uplink HARQ ID for the first uplink grant 409a may be based on a subframe number in which the first uplink grant 409a is received (e.g., for FDD). If an NDI bit in the second uplink grant 413 is set to "retransmission", the base station 404 may trigger a retransmission of a data packet 415a from the CSS.

As seen in FIG. 9B, at 914, the base station may receive a first data packet associated with the first uplink HARQ process based on the first uplink grant. For example, referring to FIGS. 4A-4C, there may be no relationship between the first uplink grant 409a (e.g., in the CSS) and the second uplink grant 413 (e.g., in the USS). The first uplink grant 409a in the CSS may trigger a new transmission at the UE 406 that is received by the base station 404. In an aspect, the UE 406 may select 417 a first uplink HARQ process based on the first uplink grant 409a, and transmit a first data packet 419 associated with the first uplink HARQ process using resources allocated by the first uplink grant 409a.

At 916, the base station may receive a second data packet associated with the second uplink HARQ process based on the second uplink grant. For example, referring to FIGS. 4A-4C, if the first data packet 419 is associated with HARQ0, and if HARQ0 has pending asynchronous UL HARQ processes the UE 406 may remove 421 HARQ0 for the second uplink grant 413 in the USS, and choose another HARQ process (e.g., HARQ1, HARQ2, HARQ3, HARQ4, HARQ5, HARQ6, or HARQ7) for the second data packet 423 transmitted using resources allocated by the second uplink grant 413 (e.g., that is received by the base station 404).

At 918, the base station may receive a first data packet associated with a first set of uplink HARQ processes based on the first uplink grant. In an aspect, the first set of the uplink HARQ processes may be associated with uplink synchronous HARQ. For example, referring to FIGS. 4A-4C, the UE 406 may transmit a first data packet 419 (e.g., that may be received by base station 404) associated with a first set of uplink HARQ processes (e.g., HARQ0, HARQ1, HARQ2, HARQ3, HARQ4, HARQ5, HARQ6, HARQ7) using the first uplink grant 409a.

At 920, the base station may receive a second data packet associated with a second set of uplink HARQ processes based on the second uplink grant. In an aspect, the second set of the uplink HARQ processes may be associated with the asynchronous HARQ. For example, referring to FIGS. 4A-4C, the UE 406 may transmit a second data packet 423 (e.g., that may be received by the base station 404) associated with a second set of uplink HARQ processes (e.g., HARQ8, HARQ9, HARQ10, HARQ11, HARQ12, HARQ13, HARQ14, HARQ15) using the second uplink grant 413.

At 922, the base station may transmit a plurality of SPS grants each associated with one or more different parameters. For example, referring to FIGS. 4A-4C, the UE 406 may receive a plurality of SPS grants 409b transmitted by the base station 404. In one aspect, each of the plurality of SPS grants 409b may be associated with one or more of a different number of repetitions, a different uplink HARQ ID, a different MCS, and/or a different resource allocation. The base station 404 may transmit a plurality of SPS grants 409b, for example, when the base station 404 expects (i.e., is configured to receive) that different packet sizes (e.g., different types of video packets) will arrive from the UE 406 at predetermined times.

At 924, the base station may transmit one or more SPS grants with multiple uplink HARQ IDs each associated with a different subframe. For example, referring to FIGS. 4A-4C, SPS grants may be included in either the first uplink grant 409a and/or the second uplink grant 413, and separate SPS grants 409b may not be transmitted. In one aspect, each of the one or more SPS grants included in the first uplink grant 409a and/or the second uplink grant 413 may include multiple uplink HARQ IDs, and each one of the multiple uplink HARQ IDs may be associated with a different subframe.

As seen in FIG. 9C, at 926, the base station may transmit a C-RNTI associated with one of the plurality of SPS grants. For example, referring to FIGS. 4A-4C, the base station 404 may include information associated with a C-RNTI in a transmission of one of the plurality of SPS grants (e.g., in the first uplink grant 409a and/or the second uplink grant 413) that is received by the UE 406. Additionally and/or alternatively, the C-RNTI may be communicated to the UE 406 via separate signaling (e.g., not illustrated in FIGS. 4A-4C).

At 928, the base station may receive a retransmission of a data packet associated with the one of the plurality of SPS grants based on the C-RNTI. For example, referring to FIGS. 4A-4C, based on the C-RNTI and/or the SPS C-RNTI, the UE 406 may retransmit a data packet 415b (e.g., that may be received by the base station 404) associated with the one of the plurality of SPS grants 409b.

At 930, the base station may transmit an uplink grant associated with a retransmission of a data packet before the data packet has finished being transmitted. For example, referring to FIGS. 4A-4C, the base station 404 may transmit the new uplink grant 425 that triggers a retransmission of a data packet 427 at the UE 406. In an aspect, the new uplink grant 425 may be transmitted by the base station 404 before the data packet 419, 423, is finished being transmitted from the UE 406 to the base station 404. Additional details associated with "filling" unused resources for further retransmission of real time data packets by the UE 406 are discussed supra with respect to FIG. 5.

At 932, the base station may receive the retransmission of the data packet based on the uplink grant transmitted before the data packet finished transmitting from the UE. For example, referring to FIGS. 4A-4C, the base station 404 may transmit the new uplink grant 425 to trigger a retransmission of a data packet 427 at the UE 406 that may be received by the base station 404. In an aspect, the new uplink grant 425 may be transmitted by the base station 404 before the data packet 419, 423 is finished being transmitted from the UE 406 to the base station 404. Additional details associated with "filling" unused resources for further retransmission of real time data packets by the UE 406 are discussed supra with respect to FIG. 5.

At 934, the base station may receive a data transmission with a changed DMRS. For example, referring to FIGS. 4A-4C, the second RRC message 405 may include information associated with a number of repetitions used for the PUSCH. Here, the UE 406 may determine 429 to change a pilot pattern associated with a data transmission based on the information associated with the number of repetitions used for the PUSCH. The UE 406 may transmit the data packet 433 with the changed DMRS (e.g., that may be received by the base station 404.

Figure 10:
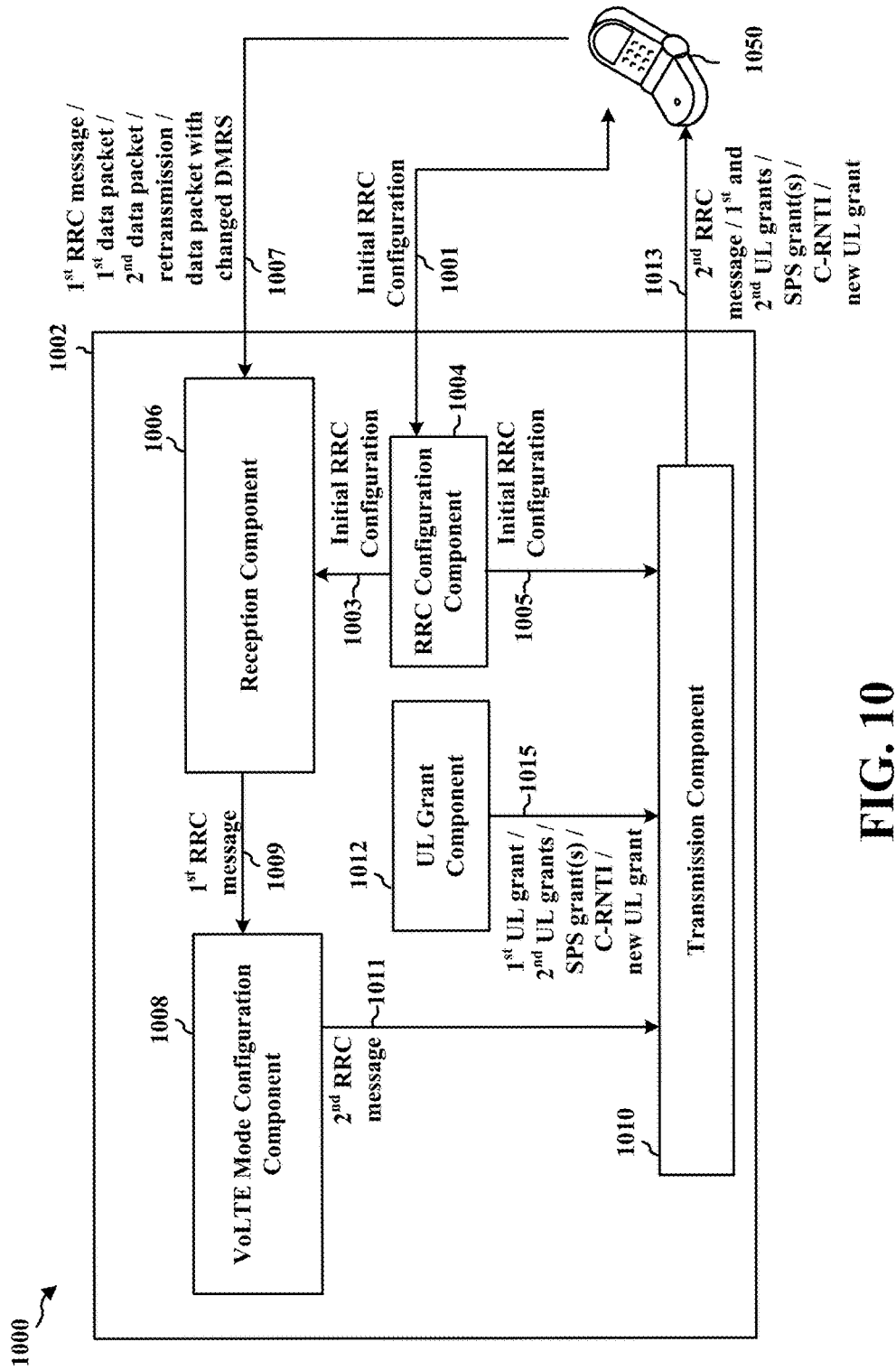
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be base station (e.g., the base station 102, 180, 404, 750, eNB 310, apparatus 1002/1002') in communication with a UE 1050 (e.g., the UE 104, 350, 406, apparatus 702/702').

The apparatus may include an RRC configuration component 1004, a reception component 1006, a VoLTE mode configuration component 1008, a transmission component 1010, and/or a UL grant component 1012. The RRC configuration component 1004 may be configured to perform an initial RRC configuration procedure 1001 with the UE 1050. In addition, the RRC configuration component 1004 may be configured to send a signal 1003, 1005 associated with the initial RRC configuration to one or more of the reception component 1006 and/or the transmission component 1010. The reception component 1006 may be configured to receive a first RRC message from the UE 1050 indicating that the UE 1050 supports a VoLTE mode. In addition, the reception component 1006 may be configured to send a signal 1009 associated with the first RRC message to the VoLTE mode configuration component 1008. The VoLTE mode configuration component 1008 may be configured to determine to configure the UE 1050 in VoLTE mode. In addition, the VoLTE mode configuration component 1008 may send a signal 1011 associated with a second RRC message that configures the UE 1050 in VoLTE mode to the transmission component 1010. The transmission component 1010 may be configured to transmit a second RRC message 1013 to the UE 1050 configuring the UE 1050 to operate in VoLTE mode. Further, the UL grant component 1012 may be configured to generate one or more of a first uplink grant, a second uplink grant, one or more SPS grant(s), and/or an SPS grant with a C-RNTI. The UL grant component 1012 may send a signal 1015 associated with one or more of a first uplink grant, a second uplink grant, one or more SPS grant(s), and/or an SPS grant with a C-RNTI to the transmission component 1010. The transmission component 1010 may be configured to transmit, in a CSS, a first uplink grant in first DCI. In one aspect, the first uplink grant may contain an uplink HARQ ID field. Additionally and/or alternatively, the transmission component 1010 may be configured to transmit, in a USS, a second uplink grant in second DCI. In an aspect, the second uplink grant may include an uplink HARQ ID associated with asynchronous uplink HARQ. Further, the reception component 1006 may be configured to receive a retransmission 1007 of a data packet based on the first uplink grant associated with the uplink HARQ ID transmitted in the second uplink grant. In an aspect, the uplink HARQ ID for the first uplink grant may be based at least on a subframe number in which the first uplink grant is transmitted. The reception component 1006 may be configured to receive a first data packet 1007 associated with the first uplink HARQ process based on the first uplink grant. Further, the reception component 1006 may be configured to receive a second data packet associated with the second uplink HARQ process based on the second uplink grant. Additionally and/or alternatively, the reception component 1006 may be configured to receive a first data packet 1007 associated with a first set of uplink HARQ processes based on the first uplink grant. In an aspect, the first set of the uplink HARQ processes may be associated with uplink synchronous HARQ. Still further, the reception component 1006 may be configured to receive a second data packet 1007 associated with a second set of uplink HARQ processes based on the second uplink grant. In an aspect, the second set of the uplink HARQ processes may be associated with the asynchronous HARQ. Further, the transmission component 1010 may be configured to transmit a plurality of SPS grants 1013 each associated with one or more different parameters. Additionally and/or alternatively, the transmission component 1010 may be configured to transmit one or more SPS grants 1013 with multiple uplink HARQ IDs each associated with a different subframe. The transmission component 1010 may be configured to transmit a C-RNTI 1013 associated with one of the plurality of SPS grants. Further, the reception component 1006 may be configured to receive a retransmission 1007 of a data packet associated with the one of the plurality of SPS grants based on the C-RNTI. The transmission component 1010 may be configured to transmit an uplink grant 1013 associated with a retransmission of a data packet before the data packet 1007 has finished being transmitted by the UE 1050. The reception component 1006 may be configured to receive the retransmission 1007 of the data packet based on the uplink grant transmitted before the data packet finished transmitting from the UE 1050. Further, the reception component 1006 may be configured to receive a data transmission (e.g., data packet) with a changed DMRS 1007 when the second RRC message includes information associated with a number of repetitions used for the PUSCH.

The apparatus may include additional components that perform each of the blocks of the algorithm in the aforementioned flowcharts of FIGS. 9A-9C. As such, each block in the aforementioned flowcharts of FIGS. 9A-9C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
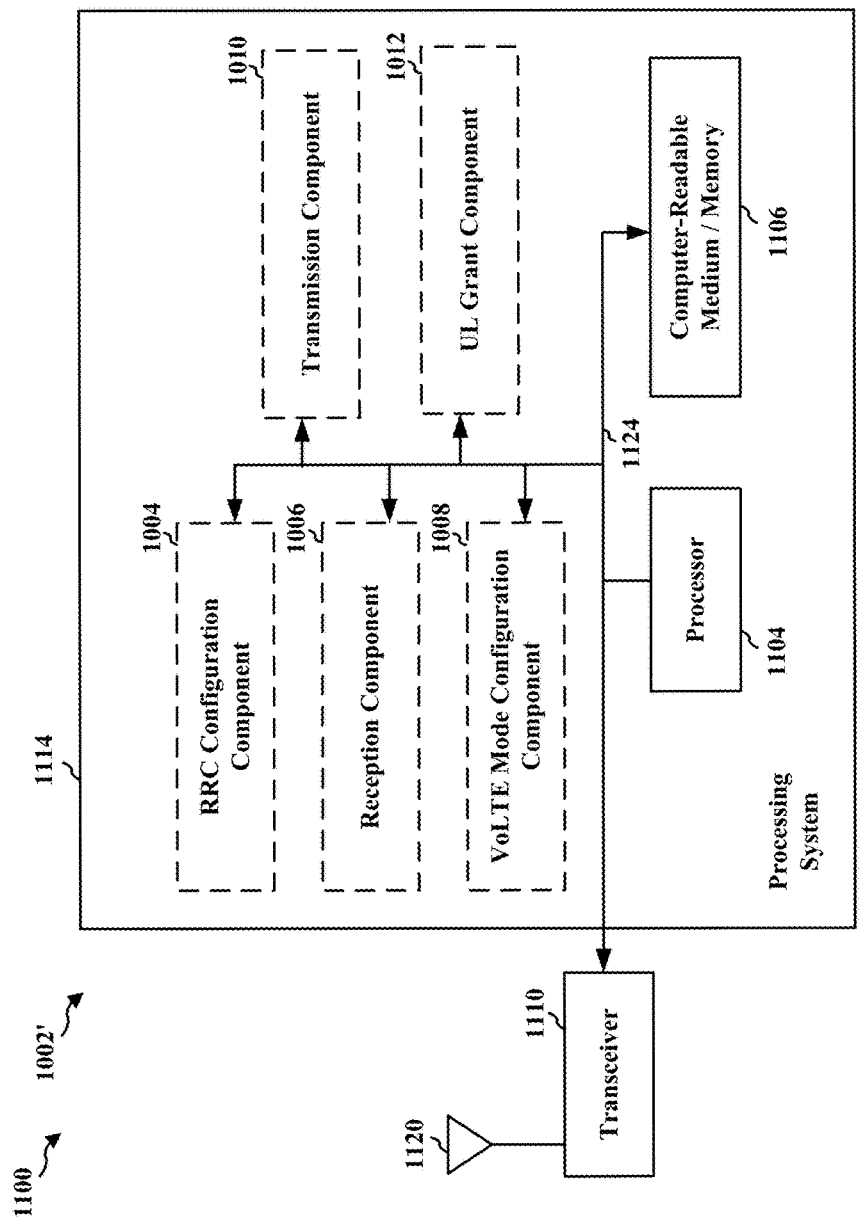
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1006. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. The processing system 1114 may be a component of the eNB 310 and may include the memory 376 and/or at least one of the TX processor 316, the RX processor 370, and the controller/processor 375.

In one configuration, the apparatus 1002/1002' for wireless communication may include means for performing an initial RRC configuration procedure with a UE. In another configuration, the apparatus 1002/1002' for wireless communication may include means for receiving a first RRC message from the UE indicating that the UE supports a VoLTE mode. In a further configuration, the apparatus 1002/1002' for wireless communication may include means for transmitting a second RRC message to the UE configuring the UE to operate in VoLTE mode. In one configuration, the apparatus 1002/1002' for wireless communication may include means for transmitting, in a CSS, a first uplink grant in first DCI. In one aspect, the first uplink grant may contain an uplink HARQ ID field. In another configuration, the apparatus 1002/1002' for wireless communication may include means for transmitting, in a USS, a second uplink grant in second DCI. In an aspect, the second uplink grant may include an uplink HARQ ID associated with asynchronous uplink HARQ. In a further configuration, the apparatus 1002/1002' for wireless communication may include means for receiving a retransmission of a data packet based on the first uplink grant associated with the uplink HARQ ID transmitted in the second uplink grant. In an aspect, the uplink HARQ ID for the first uplink grant may be based at least on a subframe number in which the first uplink grant is transmitted. In one configuration, the apparatus 1002/1002' for wireless communication may include means for receiving a first data packet associated with the first uplink HARQ process based on the first uplink grant. In another configuration, the apparatus 1002/1002' for wireless communication may include means for receiving a second data packet associated with the second uplink HARQ process based on the second uplink grant. In a further configuration, the apparatus 1002/1002' for wireless communication may include means for receiving a first data packet associated with a first set of uplink HARQ processes based on the first uplink grant. In an aspect, the first set of the uplink HARQ processes may be associated with uplink synchronous HARQ. In one configuration, the apparatus 1002/1002' for wireless communication may include means for receiving a second data packet associated with a second set of uplink HARQ processes based on the second uplink grant. In an aspect, the second set of the uplink HARQ processes may be associated with the asynchronous HARQ. In another configuration, the apparatus 1002/1002' for wireless communication may include means for transmitting a plurality of SPS grants each associated with one or more different parameters. In a further configuration, the apparatus 1002/1002' for wireless communication may include means for transmitting one or more SPS grants with multiple uplink HARQ IDs each associated with a different subframe. In one configuration, the apparatus 1002/1002' for wireless communication may include means for transmitting a C-RNTI associated with one of the plurality of SPS grants. In another configuration, the apparatus 1002/1002' for wireless communication may include means for receive a retransmission of a data packet associated with the one of the plurality of SPS grants based on the C-RNTI. In a further configuration, the apparatus 1002/1002' for wireless communication may include means for transmitting an uplink grant associated with a retransmission of a data packet before the data packet has finished being transmitted. In another configuration, the apparatus 1002/1002' for wireless communication may include means for receiving the retransmission of the data packet based on the uplink grant transmitted before the data packet finished transmitting from the UE. In one configuration, the apparatus 1002/1002' for wireless communication may include means for receiving a data transmission with a changed DMRS. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   performing an initial radio resource control (RRC) configuration procedure with a base station;
   transmitting a first RRC message to the base station, the first RRC message indicating that the UE supports a voice over Long Term Evolution (VoLTE) mode;
   receiving a second RRC message from the base station, the second RRC message configuring the UE to operate in VoLTE mode;
   monitoring a common search space (CSS) for a first uplink grant in first downlink control information (DCI), the first uplink grant not containing an uplink HARQ identification (ID) field; and monitoring a UE-specific search space (USS) for a second uplink grant, associated with the VoLTE mode, in second DCI, the second uplink grant being associated with asynchronous uplink HARQ, and the second uplink grant including a HARQ ID field.

2. The method of claim 1, further comprising:

retransmitting a data packet using the first uplink grant based on the uplink HARQ ID received in the second uplink grant, the uplink HARQ ID for the first uplink grant being based at least on a subframe number in which the first uplink grant is received.

3. The method of claim 1, further comprising:

transmitting a first data packet associated with a first uplink HARQ process using the first uplink grant, the first uplink HARQ process being part of a set of HARQ processes, and the first uplink HARQ process being associated with the CSS;

removing the first uplink HARQ process from the set of HARQ processes; and transmitting a second data packet associated with a second uplink HARQ process using the second uplink grant, the second HARQ process being part of the set of HARQ processes, and the second uplink HARQ process being different than first uplink HARQ process.

4. The method of claim 1, further comprising:

transmitting a first data packet associated with a first set of uplink HARQ processes using the first uplink grant, the first set of the uplink HARQ processes being associated with uplink synchronous HARQ; and transmitting a second data packet associated with a second set of uplink HARQ processes using the second uplink grant, the second set of the uplink HARQ processes being associated with the uplink asynchronous HARQ.

5. The method of claim 1, further comprising:

receiving an uplink grant associated with a retransmission of a data packet from the base station, the uplink grant being received before the data packet has finished transmitting to the base station; and transmitting the retransmission of the data packet using the uplink grant.

6. A method of wireless communication of a base station, comprising:

performing an initial radio resource control (RRC) configuration procedure with a user equipment (UE);

receiving a first RRC message from the UE, the first RRC message indicating that the UE supports a voice over Long Term Evolution (VoLTE) mode;

transmitting a second RRC message to the UE, the second RRC message configuring the UE to operate in VoLTE mode;

transmitting, in a common search space (CSS), a first uplink grant in first downlink control information (DCI), the first uplink grant not containing an uplink HARQ identification (ID) field; and transmitting, in a UE-specific search space (US S), a second uplink grant in second DCI, the second uplink grant including an uplink HARQ ID associated with asynchronous uplink HARQ.

7. The method of claim 6, further comprising:

receiving a retransmission of a data packet based on the first uplink grant associated with the uplink HARQ ID transmitted in the second uplink grant, the uplink HARQ ID for the first uplink grant being based at least on a subframe number in which the first uplink grant is transmitted.

8. The method of claim 6, further comprising:

receiving a first data packet associated with a first uplink HARQ process based on the first uplink grant, the first uplink HARQ process being part of a set of HARQ processes, and the first uplink HARQ process being associated with the CSS; and receiving a second data packet associated with a second uplink HARQ process based on the second uplink grant, the second HARQ process being part of the set of HARQ processes, and the second uplink HARQ process being different than first uplink HARQ process.

9. The method of claim 6, further comprising:

receiving a first data packet associated with a first set of uplink HARQ processes based on the first uplink grant, the first set of the uplink HARQ processes being associated with uplink synchronous HARQ; and receiving a second data packet associated with a second set of uplink HARQ processes based on the second uplink grant, the second set of the uplink HARQ processes being associated with the uplink asynchronous HARQ.

10. The method of claim 6, further comprising:

transmitting an uplink grant associated with a retransmission of a data packet to the UE, the uplink grant transmitting before the data packet has finished transmitting by the UE; and receiving the retransmission of the data packet based on the uplink grant.

11. An apparatus for wireless communication of a user equipment (UE), comprising:

a memory; and at least one processor coupled to the memory and configured to:

perform an initial radio resource control (RRC) configuration procedure with a base station;

transmit a first RRC message to the base station, the first RRC message indicating that the UE supports a voice over Long Term Evolution (VoLTE) mode;

receive a second RRC message from the base station, the second RRC message configuring the UE to operate in VoLTE mode;

monitor a common search space (CSS) for a first uplink grant in first downlink control information (DCI), the first uplink grant not containing an uplink HARQ identification (ID) field; and monitor a UE-specific search space (USS) for a second uplink grant in second DCI, the second uplink grant being associated with asynchronous uplink HARQ, and the second uplink grant including a HARQ ID field.

12. The apparatus of claim 11, wherein the at least one processor is further configured to:

retransmit a data packet using the first uplink grant based on the uplink HARQ ID received in the second uplink grant, the uplink HARQ ID for the first uplink grant being based at least on a subframe number in which the first uplink grant is received.

13. The apparatus of claim 11, wherein the at least one processor is further configured to:

transmit a first data packet associated with a first uplink HARQ process using the first uplink grant, the first uplink HARQ process being part of a set of HARQ processes, and the first uplink HARQ process being associated with the CSS;

remove the first uplink HARQ process from the set of HARQ processes; and transmit a second data packet associated with a second uplink HARQ process using the second uplink grant, the second HARQ process being part of the set of HARQ processes, and the second uplink HARQ process being different than first uplink HARQ process.

14. The apparatus of claim 11, wherein the at least one processor is further configured to:

transmit a first data packet associated with a first set of uplink HARQ processes using the first uplink grant, the first set of the uplink HARQ processes being associated with uplink synchronous HARQ; and transmit a second data packet associated with a second set of uplink HARQ processes using the second uplink grant, the second set of the uplink HARQ processes being associated with the uplink asynchronous HARQ.

15. The apparatus of claim 11, wherein the at least one processor is further configured to:

receive an uplink grant associated with a retransmission of a data packet from the base station, the uplink grant being received before the data packet has finished transmitting to the base station; and transmit the retransmission of the data packet using the uplink grant.

16. An apparatus for wireless communication of a base station, comprising:

a memory; and at least one processor coupled to the memory and configured to:

perform an initial radio resource control (RRC) configuration procedure with a user equipment (UE);

receive a first RRC message from the UE, the first RRC message indicating that the UE supports a voice over Long Term Evolution (VoLTE) mode;

transmit a second RRC message to the UE, the second RRC message configuring the UE to operate in VoLTE mode;

transmit, in a common search space (CSS), a first uplink grant in first downlink control information (DCI), the first uplink grant not containing an uplink HARQ identification (ID) field; and transmit, in a UE-specific search space (USS), a second uplink grant in second DCI, the second uplink grant including an uplink HARQ ID associated with asynchronous uplink HARQ.

17. The apparatus of claim 16, wherein the at least one processor is further configured to:

receive a retransmission of a data packet based on the first uplink grant associated with the uplink HARQ ID transmitted in the second uplink grant, the uplink HARQ ID for the first uplink grant being based at least on a subframe number in which the first uplink grant is transmitted.

18. The apparatus of claim 16, wherein the at least one processor is further configured to:

receive a first data packet associated with a first uplink HARQ process based on the first uplink grant, the first uplink HARQ process being part of a set of HARQ processes, and the first uplink HARQ process being associated with the CSS; and receive a second data packet associated with a second uplink HARQ process based on the second uplink grant, the second HARQ process being part of the set of HARQ processes, and the second uplink HARQ process being different than first uplink HARQ process.

19. The apparatus of claim 16, wherein the at least one processor is further configured to:

receive a first data packet associated with a first set of uplink HARQ processes based on the first uplink grant, the first set of the uplink HARQ processes being associated with uplink synchronous HARQ; and receive a second data packet associated with a second set of uplink HARQ processes based on the second uplink grant, the second set of the uplink HARQ processes being associated with the uplink asynchronous HARQ.

20. The apparatus of claim 16, wherein the at least one processor is further configured to:

transmit an uplink grant associated with a retransmission of a data packet to the UE, the uplink grant transmitting before the data packet has finished transmitting by the UE; and receive the retransmission of the data packet based on the uplink grant.

* * * * *